(12) United States Patent
Cintron

(10) Patent No.: US 12,460,310 B2
(45) Date of Patent: Nov. 4, 2025

(54) INTEGRATED SYSTEMS EMPLOYING CARBON OXIDE ELECTROLYSIS IN ALUMINUM PRODUCTION

(71) Applicant: Twelve Benefit Corporation, Berkeley, CA (US)

(72) Inventor: Enrique Cintron, Brooklyn, NY (US)

(73) Assignee: Twelve Benefit Corporation, Berkeley, CA (US)

( * ) Notice: Subject to any disclaimer, the term of this patent is extended or adjusted under 35 U.S.C. 154(b) by 0 days.

(21) Appl. No.: 18/623,555

(22) Filed: Apr. 1, 2024

(65) Prior Publication Data

US 2024/0337038 A1    Oct. 10, 2024

Related U.S. Application Data

(60) Provisional application No. 63/494,060, filed on Apr. 4, 2023.

(51) Int. Cl.
*C25C 1/00* (2006.01)
*C25C 3/22* (2006.01)

(52) U.S. Cl.
CPC ..................... *C25C 3/22* (2013.01)

(58) Field of Classification Search
CPC ..................... C25C 3/22; C25B 3/26
See application file for complete search history.

(56) References Cited

U.S. PATENT DOCUMENTS

| | | |
|---|---|---|
| 2,650,245 A | 8/1953 | Boaden et al. |
| 3,755,099 A * | 8/1973 | Haupin .................. B01D 53/68 |
| | | 205/404 |
| 4,042,496 A | 8/1977 | Tsushima et al. |
| 4,089,758 A | 5/1978 | McAloon |
| 4,176,215 A | 11/1979 | Molnar et al. |
| 4,609,440 A | 9/1986 | Frese, Jr. et al. |
| 4,761,207 A * | 8/1988 | Stewart, Jr. .......... C22B 21/0092 |
| | | 75/10.39 |

(Continued)

FOREIGN PATENT DOCUMENTS

| CN | 101981744 A | 2/2011 |
|---|---|---|
| CN | 102308028 A | 1/2012 |

(Continued)

OTHER PUBLICATIONS

Aeshala, L.M. et al., "Effect of solid polymer electrolyte on electrochemical reduction of CO2, Separation and Purification Technology," 94, (2012), pp. 131-137.

(Continued)

*Primary Examiner* — Zulmariam Mendez
(74) *Attorney, Agent, or Firm* — Weaver Austin Villeneuve & Sampson LLP

(57) ABSTRACT

Integrated systems may be characterized by: (a) an aluminum production subsystem comprising an aluminum-producing electrolysis cell configured to electrolytically produce aluminum metal from an aluminum compound; and (b) a carbon dioxide reduction subsystem comprising a carbon dioxide electrolyzer, where the carbon dioxide reduction subsystem is configured to receive carbon dioxide produced by the aluminum production subsystem and provide the carbon dioxide to the carbon dioxide electrolyzer for reduction to a carbon-containing product.

20 Claims, 7 Drawing Sheets

(56) References Cited

U.S. PATENT DOCUMENTS

| | | |
|---|---|---|
| 4,828,941 A | 5/1989 | Sterzel |
| 4,921,586 A | 5/1990 | Molter |
| 5,039,389 A | 8/1991 | McMichael |
| 5,601,937 A | 2/1997 | Isenberg |
| 5,992,008 A | 11/1999 | Kindler |
| 6,358,651 B1 | 3/2002 | Chen et al. |
| 7,605,293 B2 | 10/2009 | Olah et al. |
| 7,608,356 B2 | 10/2009 | Risen, Jr. et al. |
| 7,704,369 B2 | 4/2010 | Olah et al. |
| 7,883,817 B2 | 2/2011 | Hori et al. |
| 8,075,746 B2 | 12/2011 | Hartvigsen et al. |
| 8,131,859 B2 | 3/2012 | Fujii et al. |
| 8,137,859 B2 | 3/2012 | Shin et al. |
| 8,268,026 B2 | 9/2012 | Norbeck et al. |
| 8,277,631 B2 | 10/2012 | Eastman et al. |
| 8,366,902 B2 | 2/2013 | Hawkes et al. |
| 8,535,502 B2 | 9/2013 | Littau et al. |
| 8,592,633 B2 | 11/2013 | Cole et al. |
| 8,652,104 B2 | 2/2014 | Goral et al. |
| 8,652,704 B2 | 2/2014 | Sano et al. |
| 8,658,016 B2 | 2/2014 | Lakkaraju et al. |
| 8,721,866 B2 | 5/2014 | Sivasankar et al. |
| 8,741,244 B2 | 6/2014 | Jones |
| 8,778,156 B2 | 7/2014 | Eisaman et al. |
| 8,845,875 B2 | 9/2014 | Teamey et al. |
| 8,845,878 B2 | 9/2014 | Cole et al. |
| 8,956,990 B2 | 2/2015 | Masel et al. |
| 9,012,345 B2 | 4/2015 | Masel et al. |
| 9,108,894 B1 | 8/2015 | Foody et al. |
| 9,145,615 B2 | 9/2015 | Zhai et al. |
| 9,181,625 B2 | 11/2015 | Masel et al. |
| 9,193,593 B2 | 11/2015 | Masel et al. |
| 9,238,598 B2 | 1/2016 | Hammad et al. |
| 9,370,773 B2 | 6/2016 | Masel et al. |
| 9,464,359 B2 | 10/2016 | Masel et al. |
| 9,481,939 B2 | 11/2016 | Masel et al. |
| 9,486,771 B2 | 11/2016 | Lane et al. |
| 9,555,367 B2 | 1/2017 | Masel et al. |
| 9,566,574 B2 | 2/2017 | Masel et al. |
| 9,580,824 B2 | 2/2017 | Masel et al. |
| 9,586,181 B2 | 3/2017 | Eisaman et al. |
| 9,631,284 B2 | 4/2017 | Braun et al. |
| 9,914,683 B2 | 3/2018 | Eisaman |
| 9,920,437 B2 | 3/2018 | Reytier et al. |
| 9,937,471 B1 | 4/2018 | Eisaman |
| 10,280,378 B2 | 5/2019 | Masel |
| 10,329,676 B2 | 6/2019 | Kaczur et al. |
| 10,648,091 B2 | 5/2020 | Kuhl et al. |
| 10,822,709 B2 | 11/2020 | Kuhl et al. |
| 10,975,480 B2 | 4/2021 | Masel |
| 10,975,481 B2 | 4/2021 | Guo et al. |
| 11,142,832 B2 | 10/2021 | O'Brien et al. |
| 11,512,403 B2 | 11/2022 | Kuhl et al. |
| 11,939,284 B2 | 3/2024 | Stevic |
| 2003/0059658 A1 | 3/2003 | Kohler et al. |
| 2005/0239912 A1 | 10/2005 | Arcella et al. |
| 2006/0016685 A1 | 1/2006 | Hawkins et al. |
| 2006/0211777 A1 | 9/2006 | Severinsky |
| 2008/0283411 A1 | 11/2008 | Eastman et al. |
| 2008/0318093 A1 | 12/2008 | Lee et al. |
| 2009/0014336 A1 | 1/2009 | Olah et al. |
| 2009/0117436 A1 | 5/2009 | Choi et al. |
| 2009/0155102 A1 | 6/2009 | Park et al. |
| 2010/0137457 A1 | 6/2010 | Kaplan |
| 2010/0159347 A1 | 6/2010 | Choi et al. |
| 2010/0324256 A1 | 12/2010 | Ooms et al. |
| 2011/0206566 A1 | 8/2011 | Stoots et al. |
| 2012/0171583 A1 | 7/2012 | Bocarsly et al. |
| 2012/0228150 A1 | 9/2012 | Kang et al. |
| 2012/0328942 A1 | 12/2012 | Thomas-Alyea et al. |
| 2013/0105304 A1 | 5/2013 | Kaczur et al. |
| 2013/0118911 A1 | 5/2013 | Sivasankar et al. |
| 2013/0345325 A1 | 12/2013 | Lecomte et al. |
| 2014/0027303 A1 | 1/2014 | Cole et al. |
| 2014/0034506 A1 | 2/2014 | Teamey et al. |
| 2014/0093799 A1 | 4/2014 | Masel et al. |
| 2014/0151240 A1 | 6/2014 | Bedell et al. |
| 2014/0206894 A1 | 7/2014 | Cole et al. |
| 2014/0206896 A1 | 7/2014 | Sivasankar et al. |
| 2015/0010804 A1 | 1/2015 | Laramie et al. |
| 2015/0030888 A1 | 1/2015 | Popat et al. |
| 2015/0057458 A1 | 2/2015 | Schjodt et al. |
| 2015/0064602 A1 | 3/2015 | Lee et al. |
| 2015/0217266 A1 | 8/2015 | Sherwood |
| 2015/0232999 A1 | 8/2015 | Busskamp et al. |
| 2015/0329979 A1 | 11/2015 | Reytier et al. |
| 2016/0017503 A1* | 1/2016 | Kaczur ............... C25B 3/25 205/346 |
| 2016/0032787 A1 | 2/2016 | Hong et al. |
| 2016/0107154 A1 | 4/2016 | Masel et al. |
| 2016/0152905 A1 | 6/2016 | Kelfkens et al. |
| 2016/0161869 A1 | 6/2016 | Avneri et al. |
| 2016/0194766 A1 | 7/2016 | Eastman et al. |
| 2016/0369688 A1 | 12/2016 | Hamad et al. |
| 2017/0037522 A1 | 2/2017 | Kaczur et al. |
| 2017/0183789 A1 | 6/2017 | Matthews et al. |
| 2017/0218404 A1 | 8/2017 | Simpson et al. |
| 2017/0321333 A1 | 11/2017 | Kuhl et al. |
| 2017/0321334 A1 | 11/2017 | Kuhl et al. |
| 2017/0328239 A1 | 11/2017 | Fleischer et al. |
| 2018/0057950 A1 | 3/2018 | Co et al. |
| 2018/0086984 A1 | 3/2018 | Chen et al. |
| 2018/0086985 A1 | 3/2018 | Von Olshausen et al. |
| 2018/0171495 A1 | 6/2018 | Masel et al. |
| 2018/0194632 A1 | 7/2018 | Jakobsson et al. |
| 2018/0257057 A1 | 9/2018 | Motoshige et al. |
| 2018/0264429 A1 | 9/2018 | Sugano et al. |
| 2018/0265440 A1 | 9/2018 | Kudo et al. |
| 2019/0016594 A1 | 1/2019 | Singh et al. |
| 2019/0032228 A1 | 1/2019 | Krause et al. |
| 2019/0062931 A1 | 2/2019 | Stark et al. |
| 2019/0093241 A1 | 3/2019 | Baldauf et al. |
| 2019/0134570 A1 | 5/2019 | Pintauro et al. |
| 2019/0211463 A1 | 7/2019 | Masel |
| 2019/0226103 A1 | 7/2019 | Kuhl et al. |
| 2019/0233350 A1 | 8/2019 | Sankaranarayanan et al. |
| 2019/0359894 A1 | 11/2019 | Heidel et al. |
| 2019/0376190 A1 | 12/2019 | O'Brien et al. |
| 2020/0095124 A1 | 3/2020 | Rueger |
| 2020/0153013 A1 | 5/2020 | Herrmann et al. |
| 2020/0240023 A1 | 7/2020 | Cave et al. |
| 2020/0308718 A1 | 10/2020 | Patru et al. |
| 2020/0376479 A1 | 12/2020 | Masel |
| 2021/0002775 A1 | 1/2021 | Matsumoto et al. |
| 2021/0031137 A1 | 2/2021 | Goetheer et al. |
| 2021/0047743 A1 | 2/2021 | Goetheer et al. |
| 2021/0123146 A1 | 4/2021 | Berlinguette et al. |
| 2021/0164116 A1 | 6/2021 | Kuhl et al. |
| 2021/0285111 A1 | 9/2021 | Fernández Sanchis et al. |
| 2021/0381116 A1 | 12/2021 | Kashi et al. |
| 2021/0387139 A1 | 12/2021 | Voskian et al. |
| 2022/0136119 A1 | 5/2022 | Flanders et al. |
| 2022/0152556 A1 | 5/2022 | Hoshino |
| 2022/0153656 A1 | 5/2022 | Flanders et al. |
| 2022/0227684 A1 | 7/2022 | Hashimoto |
| 2022/0235479 A1* | 7/2022 | Scheiff ............... C25C 3/125 |
| 2022/0246966 A1 | 8/2022 | Brown |
| 2023/0175088 A1 | 6/2023 | Cintron et al. |
| 2023/0175146 A1 | 6/2023 | Kashi et al. |
| 2023/0202840 A1 | 6/2023 | Flanders et al. |
| 2023/0265572 A1 | 8/2023 | Kuhl et al. |
| 2023/0415104 A1 | 12/2023 | Huo et al. |
| 2023/0417189 A1 | 12/2023 | Ross |
| 2024/0011165 A1 | 1/2024 | Flanders et al. |
| 2024/0051909 A1 | 2/2024 | Stevic |
| 2024/0158928 A1 | 5/2024 | Wu et al. |
| 2024/0174590 A1 | 5/2024 | Stevic |
| 2024/0200208 A1 | 6/2024 | Huo et al. |

FOREIGN PATENT DOCUMENTS

| | | |
|---|---|---|
| CN | 102978653 A | 3/2013 |
| CN | 106148992 A | 11/2016 |
| CN | 106463743 A | 2/2017 |

(56) References Cited

FOREIGN PATENT DOCUMENTS

| | | |
|---|---|---|
| CN | 107180985 A | 9/2017 |
| CN | 107699915 A | 2/2018 |
| CN | 109921060 A | 6/2019 |
| CN | 112994054 A | 6/2021 |
| DE | 102006012313 A1 | 10/2007 |
| DE | 102007037672 A1 | 2/2009 |
| DE | 102013000255 A1 | 7/2014 |
| DE | 102015201132 A1 | 7/2016 |
| DE | 102015214592 A1 | 2/2017 |
| DE | 102016207420 A1 | 10/2017 |
| EP | 2163294 A1 | 3/2010 |
| EP | 3378968 A1 | 9/2018 |
| EP | 3434810 A1 | 1/2019 |
| EP | 3626861 A1 | 3/2020 |
| EP | 3670700 A1 | 6/2020 |
| EP | 3126038 B1 | 6/2021 |
| GB | 1269841 A | 4/1972 |
| JP | H06145379 A | 5/1994 |
| JP | 2009540130 A | 11/2009 |
| JP | 2010526214 A | 7/2010 |
| JP | 2014152219 A | 8/2014 |
| JP | 2015054994 A | 3/2015 |
| JP | 2015056315 A | 3/2015 |
| JP | 2015513615 A | 5/2015 |
| JP | 2015513616 A | 5/2015 |
| JP | 2016538420 A | 12/2016 |
| JP | 2017048442 A | 3/2017 |
| JP | 2017053013 A | 3/2017 |
| JP | 2017527701 A | 9/2017 |
| JP | 2019205997 A | 12/2019 |
| KR | 100962903 B1 | 6/2010 |
| KR | 20160000940 A | 1/2016 |
| KR | 20190028595 A | 3/2019 |
| WO | WO-2007041872 A1 | 4/2007 |
| WO | WO-2007108014 A1 | 9/2007 |
| WO | WO-2008124538 A1 | 10/2008 |
| WO | WO-2011100581 A1 | 8/2011 |
| WO | WO-2011108546 A1 | 9/2011 |
| WO | WO-2012006240 A1 | 1/2012 |
| WO | WO-2012050530 A1 | 4/2012 |
| WO | WO-2013006710 A2 | 1/2013 |
| WO | WO-2013016447 A2 | 1/2013 |
| WO | WO-2014018091 A1 | 1/2014 |
| WO | WO-2014032000 A1 | 2/2014 |
| WO | WO-2014042781 A2 | 3/2014 |
| WO | WO-2014043651 A2 | 3/2014 |
| WO | WO-2014046797 A2 | 3/2014 |
| WO | WO-2014154253 A1 | 10/2014 |
| WO | WO-2014160529 A1 | 10/2014 |
| WO | WO-2015035521 A1 | 3/2015 |
| WO | WO-2015184388 A1 | 12/2015 |
| WO | WO-2016039999 A1 | 3/2016 |
| WO | WO-2016124494 A1 | 8/2016 |
| WO | WO-2017014635 A1 | 1/2017 |
| WO | WO-2017021083 A1 | 2/2017 |
| WO | WO-2017116307 A1 | 7/2017 |
| WO | WO-2017171115 A1 | 10/2017 |
| WO | WO-2018001637 A1 | 1/2018 |
| WO | WO-2018044720 A1 | 3/2018 |
| WO | WO-2019020239 A1 | 1/2019 |
| WO | WO-2019051609 A1 | 3/2019 |
| WO | WO-2019120812 A1 | 6/2019 |
| WO | WO-2019136018 A2 | 7/2019 |
| WO | WO-2019144135 A1 | 7/2019 |
| WO | WO-2020057998 A1 | 3/2020 |
| WO | WO-2020125868 A1 | 6/2020 |
| WO | WO-2020157205 A1 | 8/2020 |
| WO | WO-2020245070 A1 | 12/2020 |
| WO | WO-2021108446 A1 | 6/2021 |
| WO | WO-2021252535 A2 | 12/2021 |
| WO | WO-2022031726 A2 | 2/2022 |
| WO | WO-2022061392 A1 | 3/2022 |
| WO | WO-2023205671 A2 | 10/2023 |
| WO | WO-2023212597 A1 | 11/2023 |

OTHER PUBLICATIONS

AU Office Action dated Sep. 7, 2022, in Application No. AU2019210132.
Badami, M. "Leakage effects on the performance characteristics of a regenerative blower for the hydrogen recirculation of a PEM fuel cell," Energy Conversion and Management, vol. 55, Mar. 2012, pp. 20-25.
Badami, M., "Theoretical model with experimental validation of a regenerative blower for hydrogen recirculation in a PEM fuel cell system," Energy Conversion and Management, vol. 51, Issue 3, Mar. 2010, pp. 553-560.
Balster, J. et al., "Tailoring the Interface Layer of the Bipolar Membrane", Journal of Membrane Science, vol. 365, No. 1-2, Dec. 2010, pp. 389-398.
Blaszczyk, J., "In-Situ Anode Recirculation Rate Measurement Method (Draft)," Ogura Industrial Corporation, Ballard Power Systems, Full Cell Seminar & Exposition 2011, Oct. 31-Nov. 3, 2011, 22 pages.
BR Office Action dated Nov. 28, 2022, in Application No. BR1120200149381 with English translation.
Casebolt, R., et al., "Effect of Electrolyte Composition and Concentration on Pulsed Potential Electrochemical CO2 Reduction," ChemElectroChem, Chemistry Europe, Accepted Manuscript, 25 pp.
CN Office Action dated Jan. 4, 2023, in CN Application No. CN201980021305.1 with English translation.
Delacourt et al., "Design of an Electrochemical Cell Making Syngas (CO + H2) from CO2 and H2O Reduction at Room Temperature," Journal of The Electrochemical Society, 155 (1), (2008), pp. B42-B49.
Eisaman, M D., et al., $CO_2$ Separation Using Bipolar Membrane Electrodialysis, Energy and Environmental Science, 2011, vol. 4(4), pp. 1319-1328.
Endrodi, B., "Multilayer Electrolyzer Stack Converts Carbon Dioxide to Gas Products at High Pressure with Multilayer Electrolyzer Stack Converts Carbon," acs Energy Lett. 2019, 4, 1770-1777.
EP search report dated Sep. 14, 2021, in application No. EP19741371.9.
European Office Action dated Sep. 4, 2023 in Application No. EP19741371.9.
Ganji P., et al., "Toward Commercial Carbon Dioxide Electrolysis", Advanced Sustainable Systems, Wiley, US, Jun. 9, 2020, vol. 4(8), 22 Pages.
Gurkan, B., et al., "Quinone Reduction in Ionic Liquids for Electrochemical CO 2 Separation," ACS Sustainable Chemistry & Engineering, Jun. 5, 2015, vol. 3(7), pp. 1394-1405.
Hori, Y., "Chapter 48: Co2-reduction, catalyzed by metal electrodes," Handbook of Fuel Cells—Fundamentals, Technology and Applications, vol. 2, Electrocatalysis, 2003. pp. 720-733.
IN Office Action dated Feb. 16, 2022, in Application No. IN202037034886.
International Preliminary Report on Patentability and Written Opinion dated Jun. 20, 2024 in PCT Application No. PCT/US2022/081034.
International Preliminary Report on Patentability and Written Opinion dated Jun. 20, 2024 in PCT Application No. PCT/US2022/081209.
International Preliminary Report on Patentability and Written Opinion dated May 16, 2024 in PCT Application No. PCT/US2022/079335.
International Preliminary Report on Patentability dated Feb. 16, 2023 in PCT Application No. PCT/US2021/044378.
International Search Report and Written Opinion dated Apr. 10, 2023 in PCT Application No. PCT/US2022/079335.
International Search Report and Written Opinion dated Apr. 30, 2019, for application No. PCT/US19/014586.
International Search Report and Written Opinion dated Feb. 28, 2022, in Application No. PCT/US2021/044378.
International Search Report and Written Opinion dated Jul. 20, 2023, in Application No. PCT/US2023/017576.
International Search Report and Written Opinion dated Mar. 7, 2023 in PCT Application No. PCT/US2022/081034.

(56) References Cited

OTHER PUBLICATIONS

International Search Report and Written Opinion dated May 6, 2024 in PCT Application No. PCT/US2022/081209.
International Search Report and Written Opinion dated May 29, 2024 in PCT Application No. PCT/US2023/077221.
International Search Report and Written Opinion dated Nov. 27, 2023 in PCT Application No. PCT/US2023/024184.
International Search Report and Written Opinion dated Sep. 21, 2023, in Application No. PCT/US2023/024371.
International Search Report and Written Opinion issued in PCT Application No. PCT/US2020/062080 on Mar. 16, 2021.
James, B.D., et al. 2017 DOE Hydrogen and Fuel Cells Program Review, Fuel Cell Systems Analysis, Strategic Analysis, Project IDI FC163, Jun. 8, 2017, 34 pages.
Jones J H., "The Cativa Process for the Manufacture Plant of Acetic Acid," Platinum Metals, 2000, vol. 44(3), pp. 94-105.
JP Office Action dated Jan. 4, 2023, in Application No. JP2020-561577 with English translation.
JP Office Action dated Jan. 16, 2024 in JP Application No. 2023-507462 with English translation.
JP Office Action dated Jul. 11, 2023 in Application No. JP2023-507462 with English translation.
Kalck, P., et al., "Recent Advances in the Methanol Carbonylation Reaction Into Acetic Acid," Coordination Chemistry Reviews, 2020, vol. 402, 58 pages.
Kang, J S., et al., "Redox-responsive Sorbents and Mediators for Electrochemically Based $Co_2$ Capture," Current Opinion in Green and Sustainable Chemistry, Oct. 1, 2021, vol. 31, p. 100504.
Kim, C., et al., "Impact of Pulsed Electrochemical Reduction of CO2 on the formation of C2+ Products over Cu," ACS Catal., 2020, 10, 12403-12413.
Kimura, K.W., et al., "Selective Electrochemical CO2 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.
KR Office Action dated Aug. 20, 2024 in KR Application No. 10-2020-7024266 with English translation.
KR Office Action dated Nov. 7, 2023 in KR Application No. 10-2020-7024266, with English Translation.
Kriescher, Stefanie M.A. et al, "A membrane electrode assembly for the electrochemical synthesis of hydrocarbons from C02(g) and Ho2(g), Electrochemistry Communications," 50 (2015), pp. 64-68.
Kungas R., "Review—Electrochemical CO2 Reduction for CO Production: Comparison of Low- and High-Temperature Electrolysis Technologies," Journal of The Electrochemical Society, 2020, vol. 167, 044508, 12 Pages.
Li, et al., "Electrolysis of Co2 to Syngas in Bipolar Membrane-Based Electrochemical Cells," ACS Publications, ACS Energy Letters, 2016, 1, pp. 1149-1153.
Li, et al., "Electrolytic Conversion of Bicarbonate into CO in a Flow Cell," Cell Press, Joule 3, Jun. 19, 2019, pp. 1487-1497.
Liew, F. et al., "Gas Fermentation—A Flexible Platform for Commercial Scale Production of Low-Carbon-Fuels and Chemicals from Waste and Renewable Feedstocks", Frontiers in Microbiology, May 11, 2016, vol. 7, No. 694, pp. 1-28.
Liu, Y., et al., "Electrochemically Mediated Carbon Dioxide Separation with Quinone Chemistry in Salt-concentrated Aqueous Media," Nature Communications, May 8, 2020, vol. 11(1), pp. 1-11.
Lyons W., et al., "Standard Handbook of Petroleum and Natural Gas Engineering", Ideal Gas Laws, 3rd Edition, 2016, vol. 2, pp. 148-149.
Office Action issued on Apr. 1, 2021, in U.S. Appl. No. 16/254,255.
Pappijn, C., et al., "Challenges and Opportunities of Carbon Capture and Utilization: Electrochemical Conversion of CO2 to Ethylene," Original research, 2020, vol. 8, pp. 1-12.
Qi J et al., "Selective Methanol Carbonylation to Acetic Acid on Heterogeneous Atomically Dispersed ReO4/SiO2 Catalysts," Journal of the American Chemical Society, 2020, vol. 142(33), pp. 14178-14189.
SA Office Action dated Sep. 26, 2023, in application No. SA522441684 with English Translation.
Sabatino F., et al., "Evaluation of a Direct Air Capture Process Combining Wet Scrubbing and Bipolar Membrane Electrodialysis", Industrial & Engineering Chemistry Research, vol. 59(15), 2020, pp. 7007-7020.
Sharma, et al., "Electrocatalytic Conversion of Carbon Dioxide to Fuels: A Review on the Interaction Between Co2 and the Liquid Electrolyte," WIREs Energy and Environment 2017, vol. 6, pp. 1-21.
Shi, L. et al., "A shorted membrane electrochemical cell powered by hydrogen to remove $CO_2$ from the air feed of hydroxide exchange membrane fuel cells", Nature Energy, Mar. 2022, vol. 7, 36 pages.
Spets et al. "Direct Glucose Fuel Cell With Anion Exchange Membrane in the Near Neutral State Electrolyte, International Journal of Electrochemical Science," 7, 11696-11705, Dec. 1, 2012, entire document, http.electrochemsci .org/papers/vol? /71211696 .pdf.
Srinivasan, S. et al., "Advances in Solid Polymer Electrolyte Fuel Cell Technology with Low Platinum Loading Electrodes," Journal of Power Sources, 22 (1988) pp. 359-375.
Sturman, M., et al., "Process Parameters in the Electrochemical Reduction of Carbon Dioxide to Ethylene," ChemBioEng, 2021, vol. 8(3), pp. 1-41.
Taniguchi I., et al., "Low Energy CO2 Capture by Electrodialysis", Energy Procedia, vol. 114, 2017, pp. 1615-1620.
U.S. Notice of Allowance dated Sep. 1, 2022 in U.S. Appl. No. 16/254,255.
U.S. Corrected Notice of Allowance dated Sep. 20, 2023, in U.S. Appl. No. 18/328,581.
U.S. Final Office Action dated Apr. 24, 2024 in U.S. Appl. No. 18/324,929.
U.S. Final office Action dated Aug. 21, 2023 in U.S. Appl. No. 17/452,395.
U.S. Final Office Action dated Jul. 26, 2024 in U.S. Appl. No. 18/495,406.
U.S. Final Office Action dated Jun. 5, 2024 in U.S. Appl. No. 17/444,356.
U.S. Non-Final office Action dated Jan. 20, 2023 in U.S. Appl. No. 17/452,395.
U.S. Non-Final Office Action dated Dec. 1, 2023 in U.S. Appl. No. 18/295,412.
U.S. Non-Final Office Action dated Mar. 26, 2024 in U.S. Appl. No. 17/452,395.
U.S. Non-Final Office Action dated Nov. 15, 2023 in U.S. Appl. No. 18/324,929.
U.S. Non-Final Office Action dated Oct. 5, 2023, in U.S. Appl. No. 17/444,356.
US Non-Final Office Action dated Oct. 22, 2021, in U.S. Appl. No. 16/254,255.
U.S. Notice of Allowance dated Nov. 8, 2023 in U.S. Appl. No. 18/328,581.
U.S. Appl. No. 18/051,944, inventors Kuhl et al., filed Nov. 2, 2022.
U.S. Appl. No. 18/636,022, inventors Flanders N.H, etaL, filed Apr. 15, 2024.
U.S. Restriction Requirement dated Dec. 15, 2022 in U.S. Appl. No. 17/452,395.
U.S. Restriction requirement dated Jul. 18, 2024, in U.S. Appl. No. 18/295,412.
U.S. Restriction requirement dated Jun. 23, 2023, in U.S. Appl. No. 17/444,356.
Van Bavel, S., et al., "Integrating $CO_2$ Electrolysis into the Gas-to-Liquids-Power-to-Liquids Process," ACS Energy Letters, Jul. 24, 2020, vol. 5(8), pp. 2597-2601.
Verma, et al., "The effect of electrolyte composition on the electroreduction of CO2 to CO on Ag based gas diffusion electrodes," Phys. Chem. Chem. Phys., 2016, 18, pp. 7075-7084.
Voskian, S. et al., "Faradaic electro-swing reactive adsorption for $CO_2$ capture", Energy & Environmental Science, 2019, vol. 12, pp. 3530-3547.

(56) References Cited

OTHER PUBLICATIONS

Wallace, G G., et al., "Manipulating and Monitoring Biomolecular Interactions with Conducting Electroactive Polymers," Advanced Materials, VCH Publishers, DE, Jul. 4, 2002, vol. 14(13-14), pp. 953-960.

Xia, Chuan, et al., "Continuous production of pure liquid fuel solutions via electrocatalytic CO2 reduction using solid electrolyte devices," Nature Energy, http://www.nature.com/natureenergy; https://doi.org/10.1038/s41560-019-0451-x.

Xu, Y., et al., "Self-Cleaning CO2 Reduction Systems: Unsteady Electrochemical Forcing Enables Stability," ACS Energy Letters, 2021, 6, pp. 809-815.

Zhu, Wenlei et al., "Monodisperse Au Nanoparticles for Selective Electrocatalytic Reduction of CO2 to CO.Journal of the American Chemical Society," 2013, 135, pp. 16833-16836.

International Search Report and Written Opinion dated Jul. 8, 2024 in PCT Application No. PCT/US2024/022685.

\* cited by examiner

INTEGRATED SYSTEMS EMPLOYING CARBON OXIDE ELECTROLYSIS IN ALUMINUM PRODUCTION

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in their entireties and for all purposes.

FIELD

The present disclosure relates to electrochemical cells for carbon dioxide reduction, which are integrated with metallurgy units.

BACKGROUND

Electrolytic carbon dioxide reduction reactors have been proposed for capturing and converting waste carbon oxide to useful chemical products such as carbon monoxide and oxygen. Challenges remain for integrating such reactors into industrial operations that generate carbon dioxide. Such challenges include preparing carbon dioxide streams from disparate sources for electrolysis, controlling operation of electrolyzers to effectively use such carbon dioxide to produce appropriate chemical products, and incorporating one or more such chemical products into the material flows used by industrial operations that produce the carbon dioxide.

Background and contextual descriptions contained herein are provided solely for the purpose of generally presenting the context of the disclosure. Much of this disclosure presents work of the inventors, and simply because such work is described in the background section or presented as context elsewhere herein does not mean that such work is admitted prior art.

SUMMARY

This summary is provided to introduce some concepts in simplified form that are further described below in the Detailed Description. This summary is not intended to identify key features or essential features of the claimed subject matter.

Aspects of this disclosure pertain to systems that may be characterized by the following features: (a) an aluminum production subsystem comprising an aluminum-producing electrolysis cell configured to electrolytically produce aluminum metal from an aluminum compound; and (b) a carbon dioxide reduction subsystem comprising a carbon dioxide electrolyzer, wherein the carbon dioxide reduction subsystem is configured to receive carbon dioxide produced by the aluminum production subsystem and provide the carbon dioxide to the carbon dioxide electrolyzer for reduction to a carbon-containing product.

In certain embodiments, the aluminum-producing electrolysis cell is configured to electrochemically reduce aluminum oxide in a molten salt electrolyte. In certain embodiments, the aluminum-producing electrolysis cell is configured to electrochemically reduce an aluminum halide in a molten salt electrolyte.

In certain embodiments, the carbon-containing product comprises carbon monoxide. In such embodiments, the aluminum production subsystem may be configured to receive the carbon monoxide from the carbon dioxide reduction subsystem. In some implementations, the aluminum production subsystem is configured to react the carbon monoxide with an aluminum compound and a halogen to produce an aluminum halide such as aluminum chloride. In some implementations, the aluminum production subsystem further comprises a chlorination reactor configured to react aluminum oxide with chlorine and the carbon monoxide to produce the aluminum chloride. In some cases, the system includes a carbon dioxide separator configured to remove carbon dioxide from the carbon monoxide produced by the carbon dioxide reduction subsystem. In some cases, the system includes a hydrogen separator configured to remove hydrogen from the carbon monoxide produced by the carbon dioxide reduction subsystem.

In some cases, the system includes a $CO_2$ compressor configured to compress the carbon dioxide from the aluminum production subsystem before it is provided to the carbon dioxide electrolyzer. In some cases, the system includes a $CO_2$ purifier configured to purify the carbon dioxide from the aluminum production subsystem before it is provided to the carbon dioxide electrolyzer.

Any combination of the above features may be implemented together in system aspects of this disclosure.

Some aspects of this disclosure pertain to methods of producing aluminum metal, which methods may be characterized by the following operations: (a) producing aluminum metal from an aluminum compound using an electrolysis cell, wherein producing the aluminum metal generates carbon dioxide; (b) providing the carbon dioxide to a carbon dioxide electrolyzer; and (c) electrolytically reducing the carbon dioxide to a carbon-containing product using the carbon dioxide electrolyzer.

In certain embodiments, producing aluminum metal comprises electrochemically reducing aluminum oxide in a molten salt electrolyte. In certain embodiments, producing aluminum metal comprises electrochemically reducing an aluminum halide in a molten salt electrolyte.

In certain embodiments, the carbon-containing product comprises carbon monoxide. In some implementations, a method includes reacting the carbon monoxide with an aluminum compound and a halogen to produce an aluminum halide such as aluminum chloride.

In some implementations, a method includes reacting aluminum oxide with chlorine and the carbon monoxide to produce the aluminum chloride. In some implementations, a method includes removing carbon dioxide from the carbon monoxide produced by the carbon dioxide electrolyzer. In some cases, a method includes further comprising removing hydrogen from the carbon monoxide produced by the carbon dioxide electrolyzer.

In some embodiments, a method includes compressing the carbon dioxide generated while producing the aluminum metal, wherein the compressing is performed prior to providing the carbon dioxide to the carbon dioxide electrolyzer. In some embodiments, a method includes purifying the carbon dioxide generated while producing the aluminum metal, wherein the purifying is performed prior to providing the carbon dioxide to the carbon dioxide electrolyzer.

Any combination of the above features may be implemented together in method aspects of this disclosure.

These and other features of the disclosure will be presented below, sometimes with reference to drawings.

DETAILED DESCRIPTION

Terminology

Figure 1A:
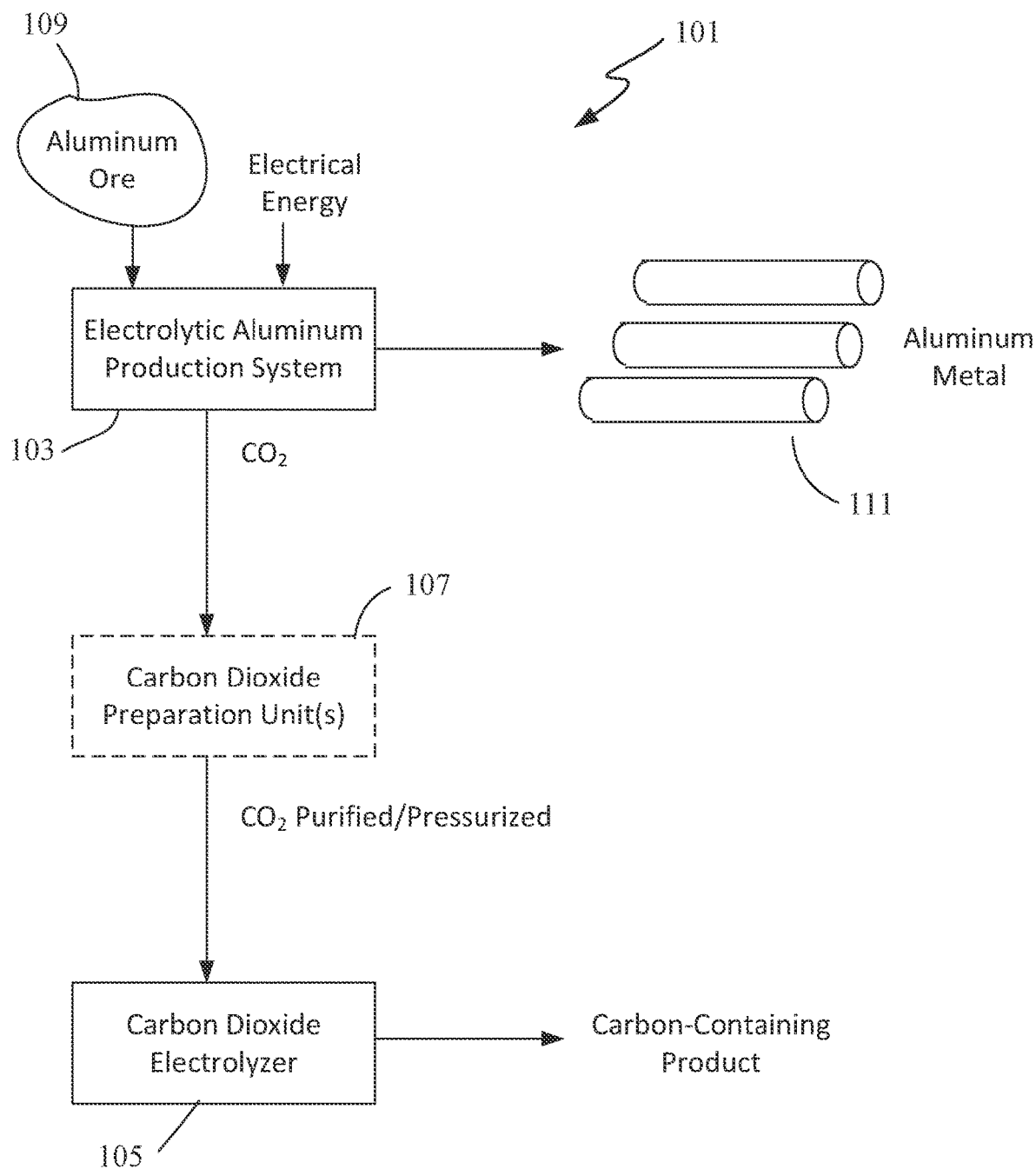
FIG. 1A depicts a system comprising an electrolytic aluminum production subsystem integrated with a $CO_2$ electrolysis subsystem.

Unless defined otherwise, all technical and scientific terms used herein have the same meaning as commonly understood by one of ordinary skill in the art. The terms presented immediately below may be more fully understood by reference to the remainder of the specification. The following descriptions are presented to provide context and an introduction to the complex concepts described herein. These descriptions are not intended to limit the full scope of the disclosure.

An "electrochemical cell" comprises an anode, a cathode, and electrolyte between the anode and cathode. At least one of the anode and cathode can undergo, catalyze, or otherwise support a faradaic reaction. In an electrolytic electrochemical cell, an external circuit applies an electrical potential difference between the anode and cathode, and that potential difference drives the faradaic reaction(s). Examples include electrolyzers such as $CO_2$ electrolyzers and water electrolyzers.

An aluminum-producing electrolysis cell refers to an electrochemical cell configured to carry out electrolytic reduction of an aluminum compound to aluminum metal. Some such cells produce aluminum by electrochemically reducing the aluminum compound while it is dissolved in a molten salt. Examples of such compounds include any of various aluminum oxides and aluminum halides. Examples of such salts include cryolite, calcium halides, and mixtures of aluminum halides and calcium halides (e.g., $CaCl_2$), $CaF_2$, and $AlCl_3$). Examples of aluminum-producing electrolysis processes, which may be carried out in aluminum-producing electrolysis cells, include the Hall-Héroult process and the chloride process.

As used herein, the term carbon oxide includes carbon dioxide ($CO_2$), carbon monoxide (CO), carbonate ions ($CO_3^{2-}$), bicarbonate ions ($HCO_3^-$), and any combinations thereof. Carbonate and bicarbonate ions may be viewed as ions that "carry" or "hold" $CO_2$ in a form that can be dissolved, melted, or otherwise provided in a liquid form, at least temporarily.

A mixture contains two or more components and unless otherwise stated may contain components other than the identified components.

Elements, units, or components herein are sometimes described or claimed as "configured to" perform an operation or operations. In such contexts, the phrase "configured to" is used to connote structure by indicating that the element, unit, or component includes structure or structural features and optionally control elements (e.g., processors, stored instructions, circuitry, etc.) that perform in a particular way during operation. As such, an element, unit, or component can be said to be configured to perform in that way even when the specified component is not necessarily currently operational (e.g., is not in use).

As used herein, the term "about" is understood to account for minor increases and/or decreases beyond a recited value, which changes do not significantly impact the desired function of the parameter beyond the recited value(s). In some cases, "about" encompasses +/−10% of any recited value. As used herein, this term modifies any recited value, range of values, or endpoints of one or more ranges.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the terms "top," "bottom," "upper," "lower," "above," and "below" are used to provide a relative relationship between structures. The use of these terms does not indicate or require that a particular structure must be located at a particular location in the apparatus.

Introduction and Context

In some embodiments, carbon oxide electrolyzers containing polymer-based membrane electrode assemblies (MEAs) are designed and/or configured to produce one or more oxidation products (e.g., oxygen) from an anode feed (e.g., water) at an anode and produce one or more carbon-containing compounds through the electrochemical reduction of carbon dioxide or other carbon oxide at a cathode. Various examples of MEAs and MEA-based carbon oxide electrolyzers are described in the following references: Published PCT Application No. 2017/192788, published Nov. 9, 2017, and titled "REACTOR WITH ADVANCED ARCHITECTURE FOR THE ELECTROCHEMICAL REACTION OF $CO_2$, CO, AND OTHER CHEMICAL COMPOUNDS," Published PCT Application No. 2019/144135, published Jul. 25, 2019, and titled "SYSTEM AND METHOD FOR CARBON DIOXIDE REACTOR CONTROL," and Published PCT Application No. 2021/108446, published Jun. 3, 2021, and titled "MEMBRANE ELECTRODE ASSEMBLY FOR COX REDUCTION," each of which is incorporated herein by reference in its entirety.

Carbon oxide electrolyzers may be integrated into any of various industrial systems. In some approaches, a carbon oxide electrolyzer receives a carbon oxide produced by an upstream process. In some approaches, a carbon oxide electrolyzer produces a carbon-containing product that is provided to a downstream process. The carbon oxide electrolyzer integrated in this manner may be configured to produce any of various chemical products that can be used for downstream processing. Examples of such products include carbon monoxide, methane, ethene, hydrogen, oxygen, and any combination thereof. Downstream processing may produce intermediate products for production of valuable industrial products such as polymers, liquid hydrocarbons, fuels, and the like. Various examples of carbon oxide electrolyzers operating conditions and such electrolyzers integrated in industrial operations are described in the following references: PCT Application Publication No. 2019/

144135, published Jul. 25, 2019, and titled "SYSTEM AND METHOD FOR CARBON DIOXIDE REACTOR CONTROL" and PCT Application No. PCT Application Publication No. 2022/031726, published Feb. 10, 2022, and titled "SYSTEM AND METHOD FOR CARBON DIOXIDE REACTOR CONTROL," each of which is incorporated herein by reference in its entirety and for all purposes.

Embodiments herein pertain to integrated systems that produce aluminum metal using aluminum producing electrolytic system and a carbon dioxide electrolyzer. Certain embodiments herein pertain to methods of using such integrated systems in producing aluminum metal. Such integrated systems and methods may be logically and/or physically divided into an electrolytic aluminum production subsystem and an electrolytic carbon dioxide reduction subsystem. In some cases, one or more components of the integrated system may be deemed to belong to either the aluminum production subsystem or the electrolytic carbon dioxide reduction subsystem, to both systems, or to an interface therebetween.

An aluminum production subsystem includes an electrolytic cell for producing aluminum metal from the aluminum compound. In some embodiments, the electrolytic cell is configured to reduce the aluminum while it is dissolved or suspended in a molten salt. An aluminum production subsystem may also include one or more feed stock processing units for converting aluminum ore or other starting feed to an aluminum compound suitable for electrolytic reduction to aluminum metal.

The feed stock processing and/or the electrolytic reduction of the aluminum compound may produce a byproduct such as carbon dioxide. Carbon dioxide is a problematic greenhouse gas. In some embodiments, an integrated system is configured to provide some or all such carbon dioxide to a carbon dioxide electrolyzer, which is configured to reduce the carbon dioxide to a more valuable carbon-containing product.

In some embodiments, a carbon dioxide electrolyzer is configured to produce carbon monoxide, which is provided to the aluminum production subsystem. In such embodiments, the aluminum production subsystem may include a unit configured to convert an aluminum ore or other aluminum-containing feedstock into an aluminum halide such as aluminum chloride. An electrolytic cell in the aluminum production subsystem may be configured to electrolytically reduce the aluminum halide to aluminum metal.

In some embodiments, carbon (in the form of one or more carbon-containing compounds) participates in one or more reactions of the aluminum production subsystem integrated with a carbon dioxide electrolyzer. In some implementations of such integrated systems, carbon is minimally lost or consumed, or not consumed at all. The carbon may be recycled through an integrated system, although, through chemical reactions, it may be present in different chemical compounds. For example, the carbon dioxide electrolyzer may be configured to produce and deliver carbon monoxide feedstock to aluminum subsystems, and the aluminum subsystem may consume carbon monoxide and outlet carbon dioxide stream. This carbon dioxide stream may be recycled back to the carbon dioxide electrolyzer. One or more separators may be employed in the integrated system to capture and/or concentrate carbon compounds and thereby facilitate recycling. As indicated, in such integrated systems, carbon is minimally consumed, or not consumed at all. To this end, in certain embodiments, only a small amount of carbon (e.g., less than 2 mole %, less than 1 mole %, less than 0.5 mole %, or less than 0.1 mole %) is lost in each pass of the integrated reactions.

Some integrated systems employ units for modifying the temperature, pressure, composition, and/or other property of one or more gas or liquid streams flowing into or out of the aluminum production subsystem and/or the carbon dioxide electrolysis subsystem. Examples of such streams are a carbon dioxide input stream for a carbon dioxide electrolyzer, an anode water stream for a carbon dioxide electrolyzer, and a carbon monoxide input stream for an aluminum halide production unit.

In some embodiments, an integrated system employs one or more carbon dioxide separation and/or recycling units. For example, carbon dioxide separation and/or recycling components may be employed to operate on one or more of the following gas streams: cathode outlet stream (gas and/or water) of the carbon dioxide electrolyzer, anode outlet stream (water and/or oxygen) of the carbon dioxide electrolyzer, outlet stream of the aluminum production subsystem, and outlet stream of the aluminum halide production unit.

Some embodiments employ (a) an electrolytic aluminum metal production subsystem that generates carbon dioxide, (b) a carbon dioxide electrolyzer that electrochemically reduces the carbon dioxide, and (c) an optional carbon dioxide preprocessing unit that adjusts one or more properties of a carbon dioxide stream from the aluminum metal production subsystem prior to delivery of such carbon dioxide stream to the carbon dioxide electrolyzer. FIG. 1A presents an example of such system. Examples of adjustable carbon dioxide properties include temperature, composition, and pressure.

As illustrated in FIG. 1A, an integrated system 101 comprises an electrolytic aluminum production system 103, a carbon dioxide electrolyzer 105, and optionally one or more carbon dioxide preparation units 107. Systems 103 and 105 are coupled in a manner that allows carbon dioxide electrolyzer 105 to consume carbon dioxide, which is a waste product produced by electrolytic aluminum production system 103.

The electrolytic aluminum production system 103 is configured to receive aluminum ore 109 and electrical energy and produce aluminum metal 111. Electrolytic aluminum production system 103 may be configured to implement the Hall-Héroult process or another process that produces aluminum and $CO_2$. An example of such other process is the "chloride process," which electrolytically produces aluminum metal from aluminum chloride. Both processes produce carbon dioxide as a byproduct. Therefore, as illustrated, electrolytic aluminum production system 103 produces carbon dioxide.

As illustrated, integrated system 101 is configured to deliver the carbon dioxide produced by electrolytic aluminum production system 103 to carbon dioxide electrolyzer 105. Optionally, integrated system 101 includes one or more carbon dioxide preparation units 107 that are configured to receive carbon dioxide from electrolytic aluminum production system 103 and modify that carbon dioxide before providing it as an input to carbon dioxide electrolyzer 105. In some implementations, the one or more carbon dioxide preparation units 107 include one or more modules for purifying, heating, and/or pressurizing the carbon dioxide produced by electrolytic aluminum production system 103.

Carbon dioxide electrolyzer 105 is configured to convert the carbon dioxide it receives to a higher value carbon-containing product, examples of which include carbon monoxide, hydrocarbons, glycols, alcohols, carboxylic acids, etc. In some embodiments, carbon dioxide electrolyzer 105 represents a plurality of carbon dioxide electrolyzers, which may be arranged as one or more stacks or skids such as explained below with reference to FIGS. 4A and 4B.

Figure 1B:
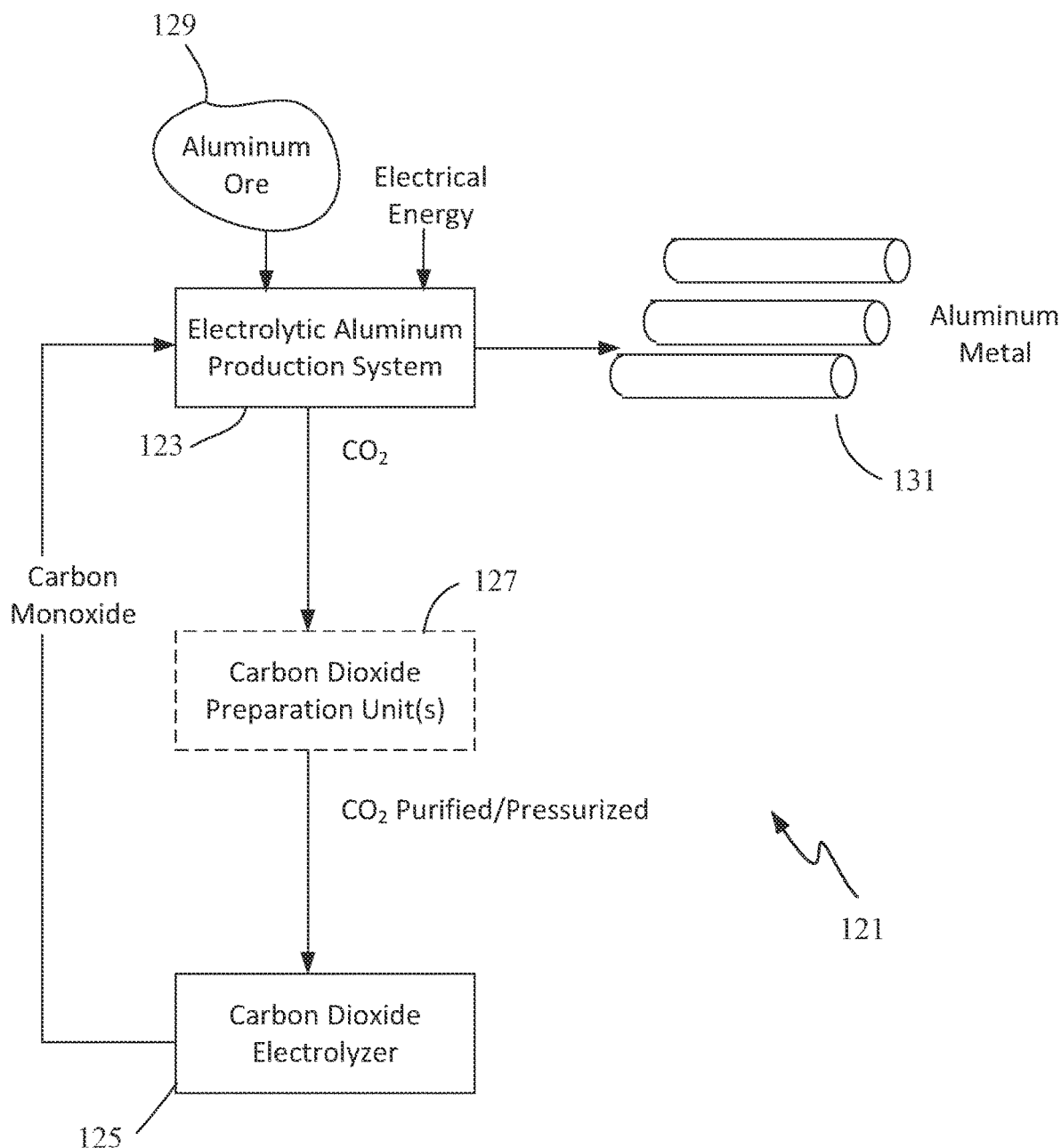
FIG. 1B depicts a system comprising an electrolytic aluminum production subsystem integrated with a $CO_2$ electrolysis subsystem, with a carbon recycle path providing CO to the aluminum production subsystem.

FIG. 1B presents another example of an integrated system. The integrated system of FIG. 1B resembles the one depicted in FIG. 1A, but the electrolytic aluminum production system in FIG. 1B is configured to utilize CO produced by a $CO_2$ electrolyzer. In some cases, an aluminum production subsystem may use the CO in an aluminum ore halogenation process. One example of such aluminum production process is the chloride process.

As depicted in FIG. 1B, an integrated system 121 includes an electrolytic aluminum production system 123 configured to receive aluminum ore 129 and electrical energy and to produce aluminum metal 131. Electrolytic aluminum production system 123 also produces a byproduct carbon dioxide stream. Integrated system 121 is configured to deliver the carbon dioxide to a carbon dioxide electrolyzer 125.

Integrated system 121 optionally includes one or more carbon dioxide preparation units 127 configured to purify, heat, and/or pressurize the carbon dioxide produced by electrolytic aluminum production system 123 and make the purified and/or pressurized carbon dioxide available to a cathode inlet of carbon dioxide electrolyzer 125.

Carbon dioxide electrolyzer 125 is configured to electrochemically reduce the carbon dioxide to carbon monoxide, and integrated system 121 is configured to convey that carbon monoxide to electrolytic aluminum production system 123 where it is used in the aluminum production process implemented therein. In certain embodiments, CO generated by carbon dioxide electrolyzer 125 is provided to a CO purifier before it is delivered to the electrolytic aluminum production system 123. In some embodiments, carbon dioxide electrolyzer 125 represents a plurality of carbon dioxide electrolyzers, which may be arranged as one or more stacks or skids such as explained below with reference to FIGS. 4A and 4B.

In integrated system 121, the electrolytic aluminum production system 123 is of a type configured to consume carbon monoxide. Not all electrolytic aluminum production systems are so designed. For example, the aluminum production systems configured to implement the Hall-Héroult process do not consume carbon monoxide, but systems configured to implement the chloride process do.

Hall-Héroult Process

The Hall-Héroult process is an electrolytic process in which aluminum oxide is dissolved in molten cryolite ($Na_3AlF_6$) and then electrolytically reduced to aluminum at a temperature of about 960° C. The process uses carbon anodes that are consumed during the electrolysis, forming $CO_2$. The aluminum oxide (alumina) is produced from bauxite, an alumina-rich clay mineral, by means of the Bayer process. Other well-known aluminum-containing compounds, such as aluminum hydroxide and aluminum oxyhydroxide, may be produced from bauxite.

In the Bayer process, bauxite ore is heated in a pressure vessel along with a sodium hydroxide solution at a temperature of about 150° C. to 200° C. At these temperatures, the aluminum dissolves as sodium aluminate. After separation of the residue by filtering, gibbsite is precipitated by cooling liquid and seeding it with fine-grained aluminum hydroxide crystals.

The Bayer process generates large quantities of red sludge (sometimes called red mud) through the digestion of bauxite with sodium hydroxide. Red sludge has high calcium and sodium hydroxide content and is very caustic. Red mud dries into a fine powder that contains iron, aluminum, calcium, and sodium. It may be a health risk.

The "Chloride Process"

Some aluminum production subsystems are configured to implement the "chloride process," which is typically a process that electrolyzes aluminum chloride to produce aluminum metal and chlorine gas. The chloride process—which is an alternative to the Hall-Héroult process—employs aluminum chloride dissolved in a molten salt bath, which is subjected to electrolysis using graphite electrodes. These electrodes may be inert, in contrast to traditional Hall-Héroult electrolysis carbon anodes, which are consumed. The chloride process can be carried out with lower energy consumption (9.6 kWh/kg Al) compared with the Hall-Héroult process (13.4 kWh/kg Al).

The chloride process operations may begin by producing aluminum chloride. The aluminum chloride production process generally uses an aluminum compound such as aluminum oxide as a source of aluminum and uses chlorine gas as a source of chlorine. It may use carbon monoxide as well. A typical aluminum chloride production reaction may be represented by Reaction 1:

$$3CO + 3Cl_2 + Al_2O_3 \rightarrow 3CO_2 + 2AlCl_3 \quad \text{(Reaction 1)}$$
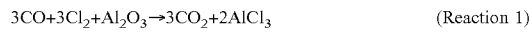

The product carbon dioxide may need to be separated from the aluminum chloride.

As indicated above, carbon dioxide from an aluminum metal production system may be used as feed to the cathode of a carbon dioxide electrolyzer. And, as just indicated, carbon monoxide produced by the electrolyzer (as a reduction product of carbon dioxide) may be provided to the aluminum production system for the aluminum chloride production reaction. This recycles carbon in the aluminum production integrated system.

In the chloride process, aluminum chloride is electrolyzed to produce aluminum metal and chlorine gas, as indicated by Reaction 2:

$$2AlCl_3 \rightarrow 2Al + 3Cl_2 \quad \text{(Reaction 2)}$$

In the electrolysis process, aluminum chloride is dissolved in a molten salt. Examples of appropriate salts include metal halides and mixtures of metal halides. Some salts include calcium halides. In some embodiments, the chlorine produced by the electrolysis reaction is recycled as an input to the aluminum chloride production process.

There are some differences between the chloride process and the Hall-Héroult process. A few examples follow.

First, the carbon consumed in Hall-Héroult process is from electrodes that must meet stringent mechanical specification. The electrodes are anodes with high mechanical strength and density, which are typically derived from coke sourced from petroleum refineries. By contrast, the carbon consumed in the chloride process is not so limited. Production of aluminum chloride by chlorination has no requirements on the mechanical properties of the carbon, which is merely a chemical reactant. For this reason, the carbon may come from atmospheric carbon dioxide or carbon recycled from another part of the system (e.g., carbon monoxide from a carbon dioxide electrolyzer).

Second, the carbochlorination reaction can produce $CO_2$ in relatively high concentrations, allowing easy capture and/or storage of the $CO_2$.

Also, the chloride process does not require pure aluminum oxide as a raw material. In some implementations, the Bayer process is omitted, thereby avoiding the problem of disposing of large quantities of red sludge resulting from that process. Direct chlorination may be performed on different types of aluminum-containing minerals. Examples of such minerals include the clay minerals bauxite and kaolinite, as well as the alunites (hydrated aluminum sulphates) and leucite-type minerals.

Still further, the chloride process takes place at a lower temperature than the Hall-Héroult process, typically at 720° C., and can be formed with lower overall energy consumption.

As indicated, an aluminum production subsystem configured to implement the chloride process may be integrated with a carbon dioxide reduction electrolyzer that is configured to produce carbon monoxide. And the aluminum production subsystem may be configured to react the carbon monoxide with an aluminum compound and a halogen to produce an aluminum halide. In some implementations, the aluminum production subsystem comprises a chlorination reactor configured to react aluminum oxide with chlorine and the carbon monoxide to produce the aluminum chloride. This is a form of an aluminum ore feed stock conversion unit.

Figure 2:
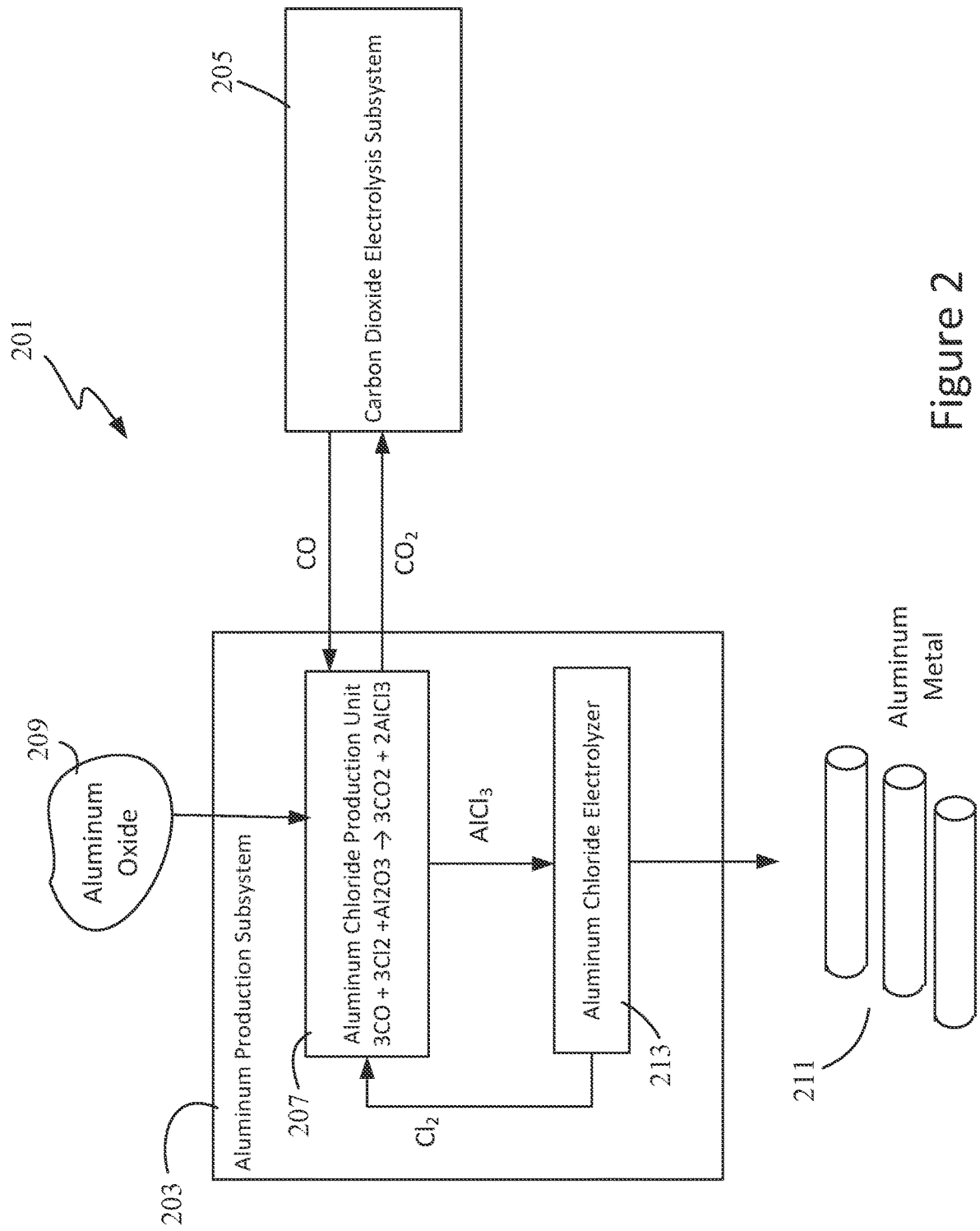
FIG. 2 depicts a system comprising an electrolytic aluminum production subsystem integrated with a $CO_2$ electrolysis subsystem, where the aluminum production subsystem comprises an aluminum chloride production unit.

FIG. 2 presents an integrated system 201 configured to implement the chloride process. As illustrated, integrated system 201 includes an aluminum production subsystem 203 and a carbon dioxide electrolysis subsystem 205. These subsystems are configured to exchange carbon dioxide and carbon monoxide, with carbon dioxide being conveyed from aluminum production subsystem 203 to carbon dioxide electrolysis subsystem 205 and carbon monoxide being conveyed from carbon dioxide electrolysis subsystem 205 to aluminum production subsystem 203. In some embodiments, carbon dioxide electrolysis subsystem 205 comprises a plurality of carbon dioxide electrolyzers, which may be arranged as one or more stacks or skids such as explained below with reference to FIGS. 4A and 4B.

The carbon dioxide conversion reaction may be represented by Reaction 3:

$$3CO_2 \rightarrow 3CO + 1.5O_2 \quad \text{(Reaction 3)}$$

In some embodiments, the carbon oxide electrolyzers employ both an anode side feed (e.g., anolyte water) and a cathode side feed (e.g., $CO_2$) which allows both anode side and cathode side reactions, as described herein.

Aluminum production subsystem 203 is configured to perform the chloride process. It includes an aluminum chloride production unit 207 and an aluminum chloride electrolyzer 213. Aluminum chloride production unit 207 may be configured to perform a reaction that converts an aluminum oxide material to aluminum chloride such as by Reaction 1 described above:

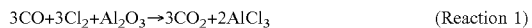
$$3CO + 3Cl_2 + Al_2O_3 \rightarrow 3CO_2 + 2AlCl_3 \quad \text{(Reaction 1)}$$

Such reaction may employ carbon monoxide produced by carbon dioxide electrolysis subsystem 205 as a reactant. The aluminum oxide material may be aluminum ore 209 or a material derived therefrom.

Aluminum chloride electrolyzer 213 may be configured to produce aluminum metal 211 and chlorine such as by Reaction 2 described above:

$$2AlCl_3 \rightarrow 2Al + 3Cl_2 \quad \text{(Reaction 2)}$$

In some implementations, aluminum production subsystem 203 is configured to transport chlorine produced by aluminum chloride electrolyzer 213 to aluminum chloride production unit 207 where it serves as a reactant.

In some implementations, aluminum production subsystem 203 is configured to separate the aluminum chloride from the carbon dioxide produced by aluminum chloride production unit 207.

Figure 3:
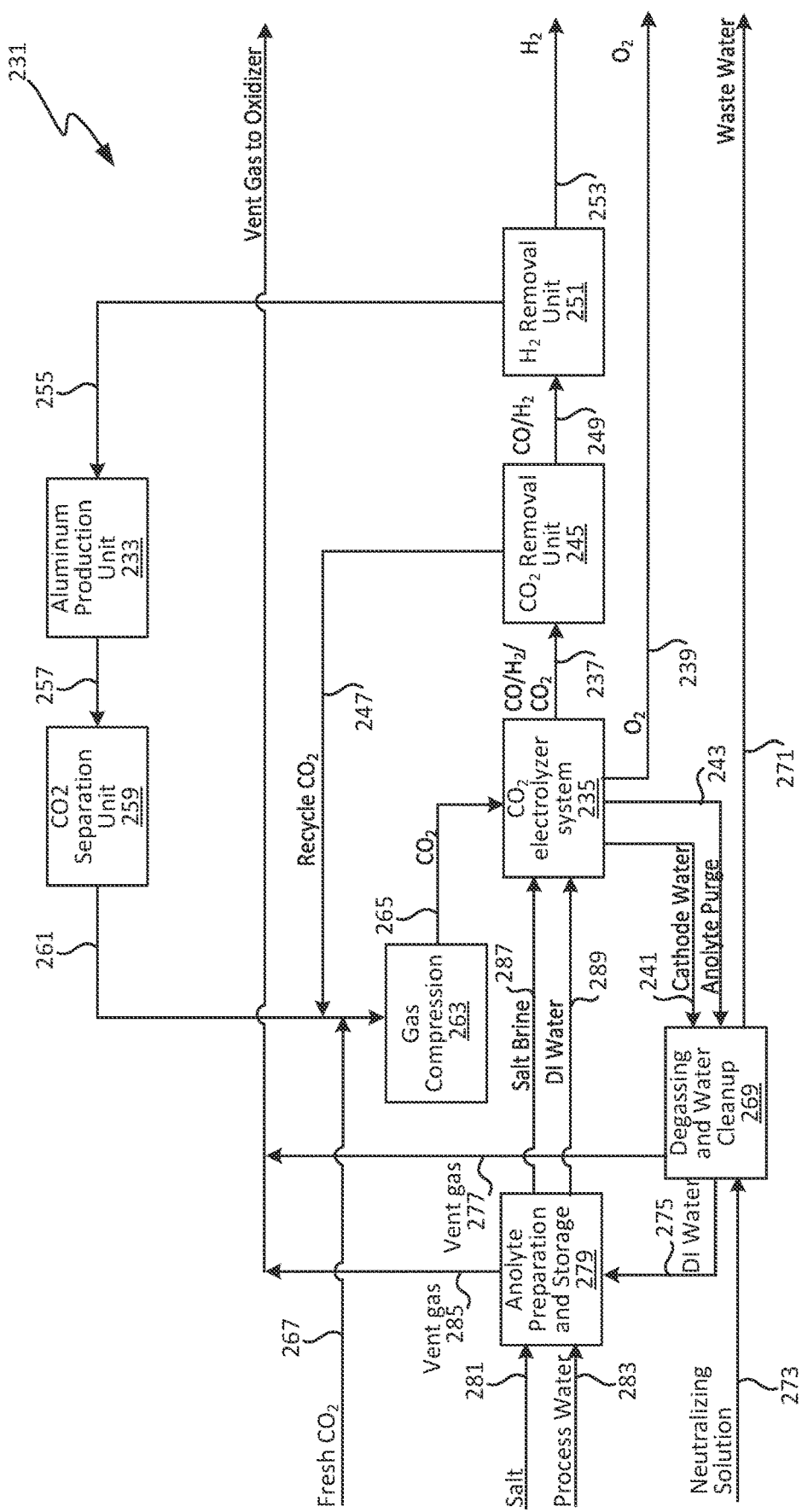
FIG. 3 depicts a system comprising an electrolytic aluminum production subsystem integrated with a $CO_2$ electrolysis subsystem, along with ancillary units for processing CO, anode water, and $CO_2$ streams.

FIG. 3 illustrates an integrated system 231 that includes an aluminum production subsystem 233 and a carbon dioxide electrolyzer system 235 similar to the integration schemes depicted in FIGS. 1A, 1B, and 2. In the embodiment of integrated system 231, the aluminum production subsystem 233 is configured to implement a chloride process or similar process that employs carbon monoxide in the production of aluminum.

Aluminum production subsystem 233 includes an aluminum halide generation unit and an aluminum production electrolyzer, such as illustrated as components 207 and 213 in FIG. 2. However, such details of aluminum production subsystem 233 are not shown in order to emphasize the interrelation of other components in integrated system 231 and the feed streams connecting them.

Carbon dioxide electrolyzer system 235 is configured to produce a cathode outlet gas stream 237, an anode oxygen gas outlet stream 239, a cathode water outlet stream 241, and an anode purge liquid outlet stream 243. Anode oxygen outlet stream 239 may be vented to the atmosphere or used as a reactant in a downstream process. Alternatively, the oxygen may be stored for later use or sale. In some embodiments, carbon dioxide electrolyzer system 235 comprises a plurality of carbon dioxide electrolyzers, which may be arranged as one or more stacks or skids such as explained below with reference to FIGS. 4A and 4B.

The gaseous cathode outlet gas stream 237 may include unreacted carbon dioxide, hydrogen, and one or more carbon dioxide reduction products such as carbon monoxide.

To utilize the component gases in cathode outlet gas stream 237, integrated system 231 includes a carbon dioxide removal unit 245 configured to separate carbon dioxide from hydrogen, carbon monoxide, and/or one or more other components present in cathode outlet gas stream 237. In some implementations, the carbon dioxide removal unit 245 comprises a sorbent-based carbon dioxide separation system that employs a sorbent such as a zeolite, an amine, an ionic liquid, or other sorbents known in the field. Such sorbents selectively absorb carbon dioxide without absorbing other components such as hydrogen and carbon monoxide. After absorbing the carbon dioxide, such sorbents are exposed to different physical conditions that facilitate the release of the previously absorbed carbon dioxide. Such other conditions may employ exposure to a different pressure, a different temperature, a different electrical potential, and the like. Such separation units are sometimes referred to as "swing" units. In some embodiments, carbon dioxide removal unit 245 is replaced or supplemented by a different sorbent that selectively absorbs carbon monoxide. Such carbon monoxide-absorbing sorbent may be provided in a carbon monoxide separation unit that is separate from carbon dioxide removal unit 245.

In the depicted embodiment, carbon dioxide removal unit 245 is configured to produce a purified carbon dioxide stream 247 and a stream 249 containing all other components such as hydrogen, carbon monoxide, and possibly other carbon-containing reduction products. Integrated system 231 is configured to recycle the purified carbon dioxide from purified carbon dioxide stream 247 back to a cathode inlet of carbon dioxide electrolyzer system 235.

It may be advantageous to remove as much hydrogen as possible from stream 249 before delivering purified carbon monoxide to the aluminum production subsystem 233. In a chloride process, for example, residual hydrogen input to the aluminum production subsystem 233 may be converted to hydrogen chloride. The presence of hydrogen halides may have an adverse effect on other system components, such as carbon dioxide electrolyzer system 235 and its associated components. Hence, the production of hydrogen halides is to be avoided, and/or hydrogen removal unit 251 is provided.

In certain embodiments, the carbon monoxide stream (e.g., carbon monoxide stream 255 in FIG. 3) supplied to the aluminum production subsystem contains no more than about 1 mole % or about 0.5 mole % of hydrogen. In some cases, the carbon monoxide stream supplied to the aluminum production subsystem contains less than 1 mole % or less than 0.5 mole % of hydrogen. In some embodiments, the carbon monoxide stream supplied to the aluminum production subsystem contains at least 95%, at least 99%, or at least 99.5% carbon monoxide (all percentages being molar %).

Integrated system 231 also includes a hydrogen separation unit 251 configured to separate hydrogen from carbon monoxide and possibly other components in stream 249. Hydrogen separation unit 251 is configured to produce a purified hydrogen stream 253 and a purified carbon monoxide stream 255. The purified hydrogen may be used in a downstream process, stored, sold, etc. Hydrogen separation unit 251 may separate hydrogen from other components by any of many known hydrogen separation processes. Examples of such processes include membrane-based separations, cryogenic processes, pressure swing adsorption, vacuum pressure swing adsorption, and the like.

One example of hydrogen separation unit 251 incorporates pressure swing adsorption to produce purified carbon monoxide stream 255 and purified hydrogen stream 253. The pressure swing adsorption process utilizes one or more carbon monoxide selective adsorbents. In some cases, the pressure swing adsorption process produces purified carbon monoxide stream 255 with at least 99% carbon monoxide, however, less than 99% carbon monoxide is also possible. In some embodiments, the pressure swing adsorption process can deliver purified carbon monoxide stream 255 at the pressure of about 2 barg. In some cases, the feed stream is delivered to the pressure swing adsorption system with a pressure of about 18 barg.

Yet another example of hydrogen separation unit 251 is a process based on carbon monoxide selective solvents. Such a process selectively removes carbon monoxide by complexation and/or decomplexation of carbon monoxide in a solvent. In some embodiments, cuprous aluminum chloride ($CuAlCl_4$) is dissolved in organic solvents such as toluene. In some cases, process based on carbon monoxide selective solvents produces purified carbon monoxide stream 255 with at least 99.5% purity or less than 99.5% purity. In some cases, the pre-treatment of the feed stream is performed to remove water, ammonia, alcohol, esters, amines, sulfides, and nitrides.

Yet another example of hydrogen separation unit 251 includes membrane-based separation. Membrane-based separation exploits polymeric membranes with a high hydrogen permeability and selectivity over CO. In membrane-based separation, due to the low partial pressure of hydrogen in the carbon monoxide product stream, the permeate side of the membrane may be purged with inert gas or vacuum-pumped to achieve a reasonable partial pressure driving force. In some embodiments, hydrogen separation unit 251 may incorporate multiple stage membrane scheme.

Another example of hydrogen separation unit 251 involves a chemical absorption of carbon dioxide using an amine solution, rejecting carbon dioxide from the carbon monoxide-rich electrolyzer product stream.

Integrated system 231 is configured to deliver purified carbon monoxide from stream 255 to the aluminum production subsystem 233, where the carbon monoxide reacts with aluminum ore or other aluminum-containing feedstock and a halogen to produce an aluminum halide. The aluminum halide is reduced electrolytically in an aluminum electrolyzer to produce aluminum metal and halogen gas. As indicated above, the process of producing the aluminum halide from a halogen gas and carbon monoxide produces carbon dioxide as a byproduct. In integrated system 231, this carbon dioxide byproduct is output from aluminum production aluminum production subsystem 233 in a carbon dioxide stream 257.

Integrated system 231 includes a carbon dioxide separation unit 259 configured to receive carbon dioxide stream 257 and output a purified carbon dioxide gas stream 261. The carbon dioxide separation unit 259 may be configured to implement a sorbent-based separation process, a membrane separation process, or other separation process.

Integrated system 231 includes a gas compressor 263 configured to receive purified carbon dioxide and adjust its physical conditions as appropriate for inputting to the cathode of carbon dioxide electrolyzer system 235. Integrated system 231 is configured to purify carbon dioxide from both purified carbon dioxide gas stream 261 and purified carbon dioxide stream 247 (output from carbon dioxide removal unit 245). In certain embodiments, compressor 263 receives the purified carbon dioxide stream at a pressure of about 1 to 2 bar and compresses it to produce outlet carbon dioxide stream 265 having a total pressure of up to about 20 bar, e.g., about 7 to 9 bar, which is suitable for introduction to carbon dioxide electrolyzer system 235.

Note that the carbon dioxide in outlet carbon dioxide stream 265, which is fed to carbon dioxide electrolyzer system 235, effectively recycles the carbon that would otherwise be vented or otherwise lost in the production of aluminum. However, some carbon dioxide may be lost in the process executed by integrated system 231. To this end, a stream of fresh carbon dioxide 267 may be provided upstream of compressor 263.

Integrated system 231 also includes a subsystem configured to maintain anode water at appropriate conditions for carbon dioxide electrolyzer system 235. These conditions include the salt concentration and pH of the anode water. To this end, integrated system 231 is configured to provide cathode water outlet stream 241 and anode purge liquid outlet stream 243 to a degassing and water cleanup unit 269. Degassing and water cleanup unit 269 may be operated in a bleed and feed mode, in which a fraction of the water circulating in the system is bled as waste water (wastewater stream 271) and fresh solution (fresh solution stream 273) is consistently fed/added to make up for the lost waste water.

Degassing and water cleanup unit 269 is configured to output wastewater stream 271 and a deionized water stream 275. It is also configured to vent waste gas in stream 277. The deionized water in deionized water stream 275 is useful for producing fresh anode water that can be fed back to carbon dioxide electrolyzer system 235. To this end, integrated system 231 is configured to provide deionized water stream 275 to an anolyte preparation and storage unit 279, which is also configured to receive input salt 281 and input process water 283. Storage unit 279 is configured to produce some vent gas 285, which may be combined with vent gas in stream 277 from degassing and water cleanup unit 269 and expelled from the system.

Anolyte preparation and storage unit 279 is configured to produce and output a salt brine stream 287 and a deionized water stream 289. As illustrated, integrated system 231 is configured to provide salt brine stream 287 and deionized water stream 289 as inputs to carbon dioxide electrolyzer system 235. In certain embodiments, the salt brine solution serves as the anode water.

Anolyte preparation and storage unit 279 may be optional. In some implementations, anolyte preparation and storage unit 279 is exchangeable with other anolyte processing elements. In some embodiments, one or more of the anolyte processing elements are disposed within the carbon dioxide electrolyzer system 235.

In general, an anolyte maintenance subsystem (i.e., degassing and water cleanup unit 269 and/or anolyte preparation and storage unit 279) may receive cathode water as well as anolyte (anode water) as an input. In some cases, it also degasses the cathode water, which contains gaseous carbon-containing reduction products as well as unreacted carbon dioxide. In some implementations, the anolyte maintenance subsystem employs reverse osmosis to remove excess salt in the purged anolyte. In some implementations, the anolyte maintenance subsystem adjusts the pH of the purged anolyte. For example, the subsystem may neutralize acidic anolyte and/or acidic cathode water. In some implementations, the anolyte maintenance subsystem adds some amount of salt back to the anolyte before providing it to the carbon dioxide electrolyzer anode.

Note that while various gas and liquid streams are referenced in this discussion of integrated system 231 and other systems herein, these streams only exist during operation. Whether in operation or sitting idle, the streams are provided in physical conduits. References to streams herein should be understood to similarly reference the physical conduits that transport the streams during operation.

Separating $CO_2$ from $AlCl_3$

The operation of separating $CO_2$ from $AlCl_3$ may include purifying $CO_2$ before providing it to the $CO_2$ electrolyzer. See, e.g., one or more carbon dioxide preparation units 127 of FIG. 1B and carbon dioxide separation unit 259 in FIG. 3. In some embodiments, the $CO_2$ may include solids such as aluminum oxide and/or metal halides such as aluminum chloride. Such solids may be mechanically abrasive, and they or their derivatives may poison, passivate, or otherwise degrade a catalyst in the $CO_2$ electrolyzer catalyst layer. Therefore, in some embodiments, the aluminum production system and/or the carbon dioxide electrolysis system includes one or more units for removing metal oxides, metal halides, or other similar contaminants from the $CO_2$ stream before it enters the $CO_2$ electrolyzer. Examples of such units include water scrubbers, venturi scrubbers, filters, and gas cyclones.

Further, in some embodiments, $CO_2$ produced by the chloride process contains a corrosive material such as hydrochloric acid. Unmitigated, such material may corrode components of an electrolyzer stack such as steel structural elements. Therefore, in some embodiments, the aluminum production system and/or the carbon dioxide electrolysis system includes one or more units for removing the corrosive component. Examples of such units include PH neutralizers, and/or caustic scrubbers. In some embodiments, the $CO_2$ electrolyzer comprises corrosion-resistant structural materials such as polymers (e.g., a polyolefin, a polyfluorinated olefin, a polycarbonate, and the like) in lieu of metal or other corrosion-susceptible components.

While the above examples of systems and units for purifying $CO_2$ identify impurities that arise from a chloride process, similar impurities may be generated in other aluminum production systems such as Hall-Héroult systems. Examples of impurities that can arise from various aluminum production systems include aluminum compounds such as aluminum oxides and aluminum halides, electrolytes (e.g., cryolite), and hydrogen halides. With any such aluminum production system, one or more $CO_2$ purification units may be employed to remove the relevant impurity(ies).

As indicated above, some implementations employ $CO_2$ purifiers upstream of a carbon dioxide electrolyzer, and such purifiers separate $CO_2$ from other gases in a stream. In FIG. 3, such purifiers may be embodied in carbon dioxide removal unit 245 and carbon dioxide separation unit 259. Examples of suitable $CO_2$ separation technologies include membrane separation technology (which balance selectivity and capacity), pressure swing absorption technology (using, e.g., zeolite sorbents), and solvent-based absorber/stripper technology.

Inlet conditions of $CO_2$ to the $CO_2$ electrolyzer

As indicated in the discussion of certain embodiments above, carbon dioxide generated in the aluminum production subsystem may not have conditions suitable for inlet to a carbon dioxide electrolyzer. Therefore, the carbon dioxide stream from the aluminum production subsystem may need to be pressurized, purified, cooled, or any combination thereof. In certain embodiments, the pressure of the carbon dioxide stream provided to the carbon dioxide electrolyzer is about 5 to 10 bar or about 7 to 9 bar. In certain embodiments, the temperature of the carbon dioxide stream provided to the carbon dioxide electrolyzer is less than 100° C., such as about 30 to 80° C., about 50 to 70° C., or about 35 to 50° C. In certain embodiments, the concentration of the carbon dioxide stream provided to the carbon dioxide electrolyzer is at least about 97 mole % or about 98 to 99.5 mole %.

$CO_2$ Electrolyzer Outputs

An integrated $CO_2$ purifier and $CO_2$ electrolyzer system may output one or more chemically reduced $CO_2$ products from the electrolyzer's cathode. Such outputs may include one or more carbon-containing products such as carbon monoxide, one or more hydrocarbons (e.g., methane, ethene, and/or ethane), one or more alcohols (e.g., methanol, ethanol, n-propanol, and/or ethylene glycol), one or more aldehydes (e.g., glycolaldehyde, acetaldehyde, glyoxal, and/or propionaldehyde), one or more ketones (e.g., acetone and/or hydroxyacetone), one or more carboxylic acids (e.g., formic acid and/or acetic acid), and any combination thereof. The electrolyzer's cathode may also produce $H_2$. A $CO_2$ purifier and electrolyzer integrated system may output one or more chemically oxidized $H_2O$ products such as oxygen. Additional outputs of an electrolyzer may include unreacted $CO_2$ and/or unreacted $H_2O$.

A $CO_2$ electrolyzer of the disclosure may be directly connected (e.g., via the cathode flow field and/or gas diffusion layer) to a downstream system (e.g., an aluminum production subsystem). In some embodiments, the downstream system may comprise a purification system; a gas compression system; or both a purification system and a gas compression system, in either order; which then optionally connect to an input of a downstream reactor and/or to one or more storage devices. Multiple purification systems and/or gas compression systems may be employed. In various embodiments, carbon monoxide, hydrogen, and/or oxygen produced by a carbon oxide electrolyzer is provided to a storage vessel for the carbon monoxide, hydrogen, and/or a storage vessel for the oxygen.

An integrated $CO_2$ electrolyzer and $CO_2$ purifier a described herein may be configured, designed, and/or controlled in a manner that allows the electrolyzer to produce one or more $CO_2$ electrolysis products in a quantity, concentration, and/or ratio suitable for any of various downstream processes such as producing aluminum. In certain embodiments, a $CO_2$ electrolyzer is configured to produce a hydrocarbon such as methane or ethene which may be combusted and/or utilized by fuel-cell to generate electrical energy.

Different $CO_2$ electrolyzers (e.g., including different layer stacks, catalysts and/or catalyst layers, PEMs, flow fields, gas diffusion layers, cell compression configurations, and/or any other suitable aspects, etc.) can be used to produce different reduction products; however, different reduction products can additionally or alternatively be produced by adjusting the operation parameters, and/or be otherwise achieved.

$CO_2$ Electrolyzer

Carbon Oxide Electrolyzer Design and Operating Conditions

A carbon oxide electrolyzer's design and operating conditions can be tuned for particular applications. Often this involves designing or operating the electrolyzer in a manner that produces a cathode output having specified compositions. In some implementations, one or more general principles may be applied to operate an electrolyzer in a way that produces a required output stream composition.

High $CO_2$ reduction product (particularly CO) to $CO_2$ ratio operating parameter regime In certain embodiments, an electrolyzer is configured to produce, and when operating actually produce, an output stream having a $CO:CO_2$ molar ratio of at least about 1:1 or at least about 1:2 or at least about 1:3. A high CO output stream may alternatively be characterized as having a CO concentration of at least about 25 mole %, or at least about 33 mole %, or at least about 50 mole %.

In certain embodiments, this high carbon monoxide output concentration is obtained by operating a carbon dioxide electrolyzer in a manner that produces any one of or any combination of the following operating conditions:
  a current density of at least about 300 $mA/cm^2$, at the cathode,
  a $CO_2$ stoichiometric flow rate (as described elsewhere herein) of at most about 4, or at most about 2.5, or at most about 1.5,
  a temperature of at most about 80° C. or at most about 65° C.,
  a pressure range of about 75 to 400 psig,
  an anode water composition of about 0.1 to 50 mM bicarbonate salt, and
  an anode water pH of at least about 1.

In certain embodiments, the electrolyzer may be built to favor high $CO:CO_2$ molar ratios or concentrations, as defined here, by using a carbon dioxide electrolyzer having any one of or any combination of the following properties:
  relatively small nanoparticle cathode catalysts (e.g., having largest dimensions of, on average, about 0.1-15 nm),
  gold as the cathode catalyst material,
  a cathode catalyst layer thickness of about 5-20 µm,
  a cathode gas diffusion layer (GDL) with a microporous layer (MPL),
  a cathode GDL with PTFE present at about 1-20 wt %, or about 1-10 wt %, or about 1-5 wt %,
  a GDL that has a thickness of at least about 200 µm,
  a bipolar MEA having an anion-exchange cathode buffer layer having a thickness of at least about 5 µm, and
  a cathode flow field having parallel and/or serpentine flow paths.

High Reduction Product to Hydrogen Product Stream Operating Parameter Regime

In certain embodiments, a carbon dioxide electrolyzer is configured to produce, and when operating actually produces, an output stream having $CO:H_2$ in a molar ratio of at least about 2:1. In some embodiments, a carbon dioxide electrolyzer is configured to produce an output stream having $CO:H_2$ molar ratios at least about 3:1, 5:1, 7:1, 10:1. In some embodiments output stream of a carbon dioxide electrolyzer may have $CO:H_2$ molar ratios up to 20:1, 50:1, 100:1, or higher. In some embodiments, a carbon dioxide electrolyzer is configured to produce an output stream having $CO:H_2$ molar ratios between 2:1 and 100:1; between 3:1 and 50:1; between 7:1 and 50:1; between 10:1 and 100:1.

In certain embodiments, such product rich output concentration is obtained by operating a carbon dioxide electrolyzer in a manner that produces any one of or any combination of the following operating conditions:
  a current density at the cathode of at least about 300 $mA/cm^2$,
  a $CO_2$ mass transfer stoichiometric flow rate to the cathode of at least about 1.5, or at least about 2.5, or at least about 4,
  a temperature of at most about 80° C.,
  a pressure in the range of about 75 to 400 psig,
  an anode water composition of about 0.1 mM to 50 mM bicarbonate salt, and
  an anode water pH of greater than about 1.

In certain embodiments, the electrolyzer may be built to favor product-rich molar ratios or concentrations, as defined here, by using a carbon dioxide electrolyzer having any one of or any combination of the following properties:
  relatively small nanoparticle catalysts (e.g., having largest dimensions of, on average, about 0.1-15 nm),
  gold as the cathode catalyst material,
  a cathode catalyst layer thickness of about 5-20 µm,
  a cathode gas diffusion layer with a microporous layer (MPL),
  a cathode GDL with PTFE present at about 1-20 wt %, or about 1-10 wt %, or about 1-5 wt %,
  a cathode GDL that has a thickness of at least about 200 µm, and
  a bipolar MEA having an anion-exchange layer with a thickness of at least about 5 µm.

Carbon Oxide Electrolyzer Embodiments

Figure 4A:
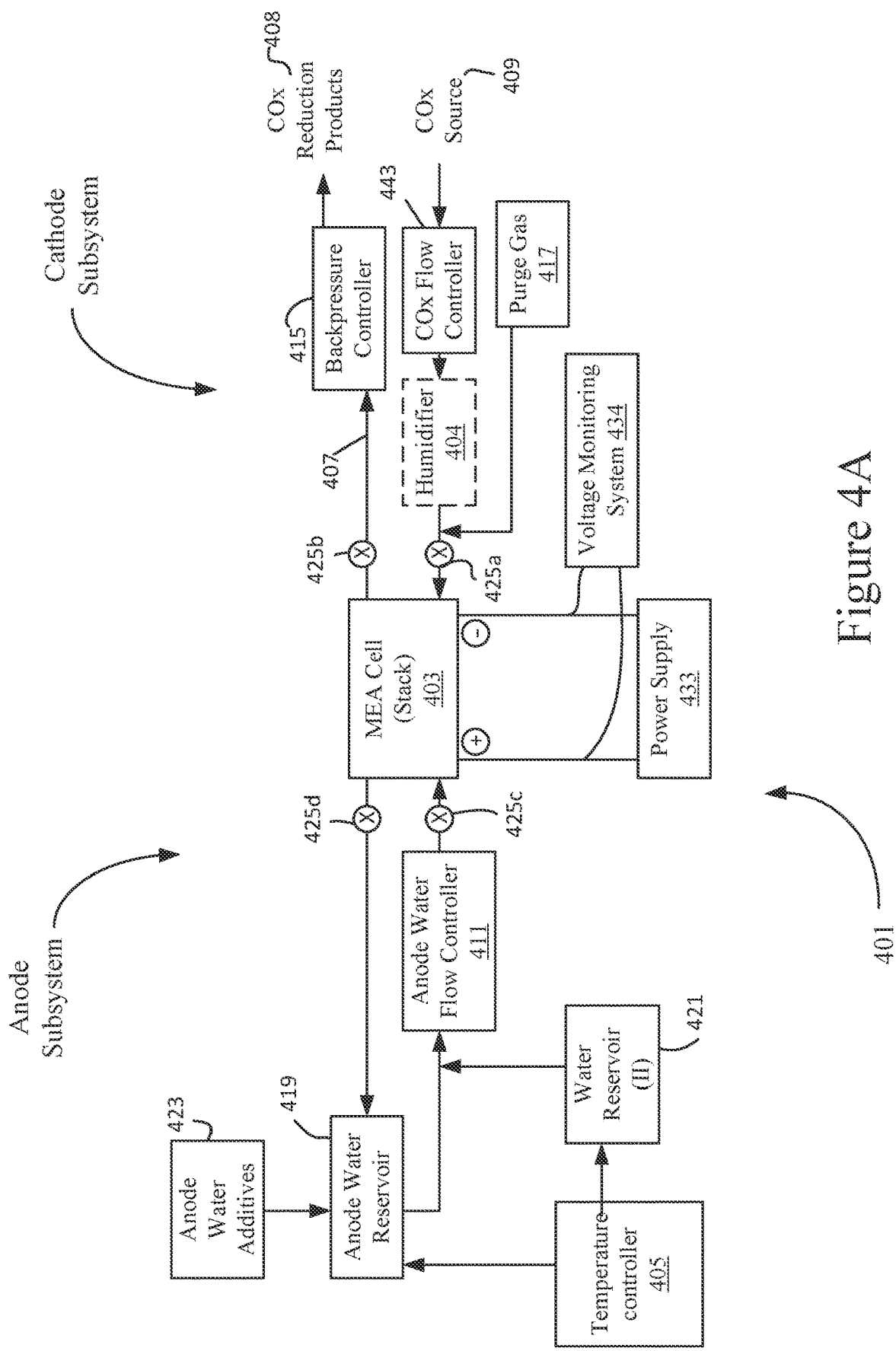
FIG. 4A depicts an example system for a carbon oxide reduction reactor that may include a cell comprising a MEA (membrane electrode assembly).

FIG. 4A depicts an example system 401 for a carbon oxide reduction reactor or electrolyzer 403 that may include a cell comprising a MEA (membrane electrode assembly). The reactor may contain multiple cells or MEAs arranged in a stack. In some embodiments, multiple cells or MEAs are arranged in parallel or connected in series. In some embodiments, multiple cells may optionally include bipolar stack. In some cases, multiple electrolyzer stacks may be arranged in a skid. In some embodiments, multiple skids may be present in the system.

A multi-cell carbon oxide reduction electrolyzer stack may include any of a variety of appropriate number of cells, such as at least 2, at least 4, at least 10, at least 20, at least 40, at least 50, at least 80, at least 100, or more, and/or up to 100, up to 150, up to 200, up to 400, up to 600, up to 800, or more. Any combinations of the above-referenced ranges are possible (e.g., at least 2 and up to 50, at least 50 and up to 100, etc.). Other ranges are also possible. Further description of the carbon oxide reduction reactor or electrolyzer comprising multiple cells is provided below.

System 401 includes an anode subsystem that interfaces with an anode of electrolyzer 403 and a cathode subsystem that interfaces with a cathode of electrolyzer 403. System 401 is an example of a system that may be used with or to implement any of the methods or operating conditions described above.

As depicted, the cathode subsystem includes a carbon oxide source 409 configured to provide a feed stream of carbon oxide to the cathode of electrolyzer 403, which, during operation, may generate an output stream 408 that includes product(s) of a reduction reaction at the cathode. The product stream 408 may also include unreacted carbon oxide and/or hydrogen.

The carbon oxide source 409 is coupled to a carbon oxide flow controller 413 configured to control the volumetric or mass flow rate of carbon oxide to electrolyzer 403. One or more other components may be disposed on a flow path from flow carbon oxide source 409 to the cathode of electrolyzer 403. For example, an optional humidifier 404 may be provided on the path and configured to humidify the carbon oxide feed stream. Humidified carbon oxide may moisten one or more polymer layers of an MEA and thereby avoid drying such layers. Another component that may be disposed on the flow path is a purge gas inlet coupled to a purge gas source 417. In certain embodiments, purge gas source 417 is configured to provide purge gas during periods when current is paused to the cell(s) of electrolyzer 403. In some implementations, flowing a purge gas over an MEA cathode facilitates recovery of catalyst activity and/or selectivity. Examples of purge gases include carbon dioxide, carbon monoxide, hydrogen, nitrogen, argon, helium, oxygen, and mixtures of any two or more of these. Further details of MEA cathode purge processes and systems are described in US Patent Application Publication No. 20220267916, published Aug. 25, 2022, which is incorporated herein by reference in its entirety.

During operation, the output stream from the cathode flows via a conduit 407 that connects to a backpressure controller 415 configured to maintain pressure at the cathode side of the cell within a defined range (e.g., about 50 to 800 psig, depending on the system configuration). The output stream may provide the reaction products 408 to one or more components (not shown) for separation and/or concentration.

In certain embodiments, the cathode subsystem is configured to controllably recycle unreacted carbon oxide from the outlet stream back to the cathode of electrolyzer 403. In some implementations, the output stream is processed to remove reduction product(s) and/or hydrogen before recycling the carbon oxide. Depending upon the MEA configuration and operating parameters, the reduction product(s) may be carbon monoxide, hydrogen, hydrocarbons such as methane and/or ethylene, oxygen-containing organic compounds such as formic acid, acetic acid, and any combinations thereof. In certain embodiments, one or more components, not shown, for removing water from the product stream are disposed downstream form the cathode outlet. Examples of such components include a phase separator configured to remove liquid water from the product gas stream and/or a condenser configured to cool the product stream gas and thereby provide a dry gas to, e.g., a downstream process when needed. In some implementations, recycled carbon oxide may mix with fresh carbon oxide from source 409 upstream of the cathode.

As depicted in FIG. 4, an anode subsystem is configured to provide an anode feed stream to an anode side of the carbon oxide electrolyzer 403. In certain embodiments, the anode subsystem includes an anode water source, not shown, configured to provide fresh anode water to a recirculation loop that includes an anode water reservoir 419 and an anode water flow controller 411. The anode water flow controller 411 is configured to control the flow rate of anode water to or from the anode of electrolyzer 403. In the depicted embodiment, the anode water recirculation loop is coupled to components for adjusting the composition of the anode water. These may include a water reservoir 421 and/or an anode water additives source 423. Water reservoir 421 is configured to supply water having a composition that is different from that in anode water reservoir 419 (and circulating in the anode water recirculation loop). In one example, the water in water reservoir 421 is pure water that can dilute solutes or other components in the circulating anode water. Pure water may be conventional deionized water even ultrapure water having a resistivity of, e.g., at least about 15 MOhm-cm or over 18.0 MOhm-cm. Anode water additives source 423 is configured to supply solutes such as salts and/or other components to the circulating anode water. Examples of anode water salts for various carbon oxide electrolyzer configurations are presented in US Patent Application Publication No. 20200240023, published Jul. 30, 2020, which is incorporated herein by reference in its entirety.

During operation, the anode subsystem may provide water or other reactant to the anode of electrolyzer 403, where it at least partially reacts to produce an oxidation product such as oxygen. The product along with unreacted anode feed material is provided in a reduction reactor outlet stream. Not shown in FIG. 4 is an optional separation component that may be provided on the path of the anode outlet stream and configured to concentrate or separate the oxidation product from the anode product stream.

Other control features may be included in system 401. For example, a temperature controller may be configured to heat and/or cool the carbon oxide electrolyzer 403 at appropriate points during its operation. In the depicted embodiment, a temperature controller 405 is configured to heat and/or cool anode water provided to the anode water recirculation loop. For example, the temperature controller 405 may include or be coupled to a heater and/or cooler that may heat or cool water in anode water reservoir 419 and/or water in reservoir 421. In some embodiments, system 401 includes a temperature controller configured to directly heat and/or cool a component other than an anode water component. Examples of such other components in the cell or stack and the carbon oxide flowing to the cathode.

Depending upon the phase of the electrochemical operation, including whether current is paused to carbon oxide reduction electrolyzer 403, certain components of system 401 may operate to control non-electrical operations. For example, system 401 may be configured to adjust the flow rate of carbon oxide to the cathode and/or the flow rate of anode feed material to the anode of electrolyzer 403. Components that may be controlled for this purpose may include carbon oxide flow controller 413 and anode water controller 411.

In addition, depending upon the phase of the electrochemical operation including whether current is paused, certain components of system 401 may operate to control the composition of the carbon oxide feed stream and/or the anode feed stream. For example, water reservoir 421 and/or anode water additives source 423 may be controlled to adjust the composition of the anode feed stream. In some cases, additives source 423 may be configured to adjust the concentration of one or more solutes such as one or more salts in an aqueous anode feed stream.

In some cases, a temperature controller such controller 405 is configured to adjust the temperature of one or more components of system 401 based on a phase of operation. For example, the temperature of cell 403 may be increased or decreased during break-in, a current pause in normal operation, and/or storage.

In some embodiments, a carbon oxide electrolytic reduction system is configured to facilitate removal of a reduction cell from other system components. This may be useful with the cell needs to be removed for storage, maintenance, refurbishment, etc. In the depicted embodiments, isolation valves 425a and 425b are configured to block fluidic communication of cell 403 to a source of carbon oxide to the cathode and backpressure controller 415, respectively. Additionally, isolation valves 425c and 425d are configured to block fluidic communication of cell 403 to anode water inlet and outlet, respectively.

The carbon oxide reduction electrolyzer 403 may also operate under the control of one or more electrical power sources and associated controllers. See, block 433. Electrical power source and controller 433 may be programmed or otherwise configured to control current supplied to and/or to control voltage applied to the electrodes in reduction electrolyzer 403. The current and/or voltage may be controlled to execute the current schedules and/or current profiles described elsewhere herein. For example, electrical power source and controller 433 may be configured to periodically pause current applied to the anode and/or cathode of reduction electrolyzer 403. Any of the current profiles described herein may be programmed into power source and controller 433.

In certain embodiments, electric power source and controller 433 performs some but not all the operations necessary to implement desired current schedules and/or profiles in the carbon oxide reduction electrolyzer 403. A system operator or other responsible individual may act in conjunction with electrical power source and controller 433 to fully define the schedules and/or profiles of current applied to reduction electrolyzer 403. For example, an operator may institute one or more current pauses outside the set of current pauses programmed into power source and controller 433.

In certain embodiments, the electrical power source and an optional, associated electrical power controller acts in concert with one or more other controllers or control mechanisms associated with other components of system 401. For example, electrical power source and controller 433 may act in concert with controllers for controlling the delivery of carbon oxide to the cathode, the delivery of anode water to the anode, the addition of pure water or additives to the anode water, and any combination of these features. In some implementations, one or more controllers are configured to control or operate in concert to control any combination of the following functions: applying current and/or voltage to reduction electrolyzer 403, controlling backpressure (e.g., via backpressure controller 415), supplying purge gas (e.g., using purge gas component 417), delivering carbon oxide (e.g., via carbon oxide flow controller 443), humidifying carbon oxide in a cathode feed stream (e.g., via humidifier 404), flow of anode water to and/or from the anode (e.g., via anode water flow controller 411), and anode water composition (e.g., via anode water reservoir 419 pure water reservoir 421, and/or anode water additives component 423).

In the depicted embodiment, a voltage monitoring system 434 is employed to determine the voltage across an anode and cathode of an MEA cell or across any two electrodes of a cell stack, e.g., determining the voltage across all cells in a multi-cell stack. The voltage determined in this way can be used to control the cell voltage during a current pause, inform the duration of a pause, etc. In certain embodiments, voltage monitoring system 434 is configured to work in concert with power supply 433 to cause reduction electrolyzer 403 to remain within a specified voltage range. For example, power supply 433 may be configured to apply current and/or voltage to the electrodes of reduction electrolyzer 403 in a way that maintains the cell voltage within a specified range during a current pause. If, for example during a current pause, the cell's open circuit voltage deviates from a defined range (as determined by voltage monitoring system 434), power supply may be configured to apply current or voltage to the electrodes to maintain the cell voltage within the specified range.

An electrolytic carbon oxide reduction system such as that depicted in FIG. 4 may employ control elements or a control system that includes one or more controllers and one or more controllable components such as pumps, sensors, dispensers, valves, and power supplies. Examples of sensors include pressure sensors, temperature sensors, flow sensors, conductivity sensors, voltmeters, ammeters, electrolyte composition sensors including electrochemical instrumentation, chromatography systems, optical sensors such as absorbance measuring tools, and the like. Such sensors may be coupled to inlets and/or outlets of an MEA cell (e.g., in a flow field), in a reservoir for holding anode water, pure water, salt solution, etc., and/or other components of an electrolytic carbon oxide reduction system.

Among the various functions that may be controlled by one or more controllers are: applying current and/or voltage to a carbon oxide reduction cell, controlling backpressure on an outlet from a cathode on such cell, supplying purge gas to a cathode inlet, delivering carbon oxide to the cathode inlet, humidifying carbon oxide in a cathode feed stream, flowing anode water to and/or from the anode, and controller anode feed composition. Any one or more of these functions may have a dedicated controller for controlling its function alone. Any two or more of these functions may share a controller. In some embodiments, a hierarchy of controllers is employed, with at least one master controller providing instructions to two or more component controllers. For example, a system may comprise a master controller configured to provide high level control instructions to (i) a power supply to a carbon oxide reduction cell, (ii) a cathode feed stream flow controller, and (iii) an anode feed stream flow controller. For example, a programmable logic controller (PLC) may be used to control individual components of the system.

In certain embodiments, a control system is configured to control the flow rate of one or more feed streams (e.g., a cathode feed stream such as a carbon oxide flow and an anode feed stream) in concert with a current schedule. For example, the flow of carbon oxide or a purge gas may be turned on, turned off, or otherwise adjusted when current applied to an MEA cell is reduced, increased, or paused.

A controller may include any number of processors and/or memory devices. The controller may contain control logic such software or firmware and/or may execute instructions provided from another source. A controller may be integrated with electronics for controlling operation the electrolytic cell before, during, and after reducing a carbon oxide. The controller may control various components or subparts of one or multiple electrolytic carbon oxide reduction systems. The controller, depending on the processing requirements and/or the type of system, may be programmed to control any of the processes disclosed herein, such as delivery of gases, temperature settings (e.g., heating and/or cooling), pressure settings, power settings (e.g., electrical voltage and/or current delivered to electrodes of an MEA cell), liquid flow rate settings, fluid delivery settings, and dosing of purified water and/or salt solution. These controlled processes may be connected to or interfaced with one or more systems that work in concert with the electrolytic carbon oxide reduction system.

In various embodiments, a controller comprises electronics having various integrated circuits, logic, memory, and/or software that receive instructions, issue instructions, control operations described herein. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a process on one or more components of an electrolytic carbon oxide reduction system. The operational parameters may, in some embodiments, be part of a recipe defined by process engineers to accomplish one or more processing steps during generation of a particular reduction product such as carbon monoxide, hydrocarbons, and/or other organic compounds.

The controller, in some implementations, may be a part of or coupled to a computer that is integrated with, coupled to the system, otherwise networked to the system, or a combination thereof. For example, the controller may utilize instructions stored remotely (e.g., in the "cloud") and/or execute remotely. The computer may enable remote access to the system to monitor current progress of electrolysis operations, examine a history of past electrolysis operations, examine trends or performance metrics from a plurality of electrolysis operations, to change parameters of current processing, to set processing steps to follow a current processing, or to start a new process. In some examples, a remote computer (e.g., a server) can provide process recipes to a system over a network, which may include a local network or the internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations.

The controller may be distributed, such as by comprising one or more discrete controllers that are networked together and working towards a common purpose, such as applying current to an MEA cell and other process controls described herein. An example of a distributed control system for such purposes includes one or more processors on a system for electrolytically reducing a carbon oxide and one or more processors located remotely (such as at the platform level or as part of a remote computer) that combine to control a process.

Controllers and any of various associated computational elements including processors, memory, instructions, routines, models, or other components are sometimes described or claimed as "configured to" perform a task or tasks. In such contexts, the phrase "configured to" is used to denote structure by indicating that the component includes structure (e.g., stored instructions, circuitry, etc.) that performs a task or tasks during operation. As such, a controller and/or associated component can be said to be configured to perform the task even when the specified component is not necessarily currently operational (e.g., is not on).

Controllers and other components that are "configured to" perform an operation may be implemented as hardware—for example, circuits, memory storing program instructions executable to implement the operation, etc. Additionally, controllers and other components "configured to" perform an operation may be implemented as hardware that is manipulated by software and/or firmware (e.g., an FPGA or a general-purpose processor executing software) to operate in manner that is capable of performing the recited task(s). Additionally, "configured to" can refer to one or more memories or memory elements storing computer executable instructions for performing the recited task(s). Such memory elements may include memory on a computer chip having processing logic.

Non-computation elements such as reactors such electrolyzers, membrane assemblies, layers, and catalyst particles may also be "configured" to perform certain functions. In such contexts, the phrase "configured to" indicate that the referenced structure has one or more features that allow the function to be performed. Examples of such features include physical and/or chemical properties such as dimensions, composition, porosity, etc.

In some embodiments, the system includes one or more carbon dioxide reduction reactors coupled to various upstream and/or downstream units, such as an anolyte circulation system, a catholyte circulation system, a temperature control system, a salt dosing system, one or more separators, one or more detectors and/or analyzers, gaseous carbon dioxide or carbon monoxide recycle loop(s), water recycle loop(s), etc.

According to some embodiments, the system includes a single or a plurality of carbon dioxide reduction reactors in the form of an assembly. The carbon dioxide reduction reactor assembly, in some embodiments, may include a plurality of carbon dioxide reduction reactors, at least one (or each) of which includes a plurality of carbon dioxide reduction electrolyzers. At least one (or each) of the plurality of carbon dioxide reduction electrolyzers may be in the form of a carbon dioxide reduction electrolyzer stack.

Figure 4B:
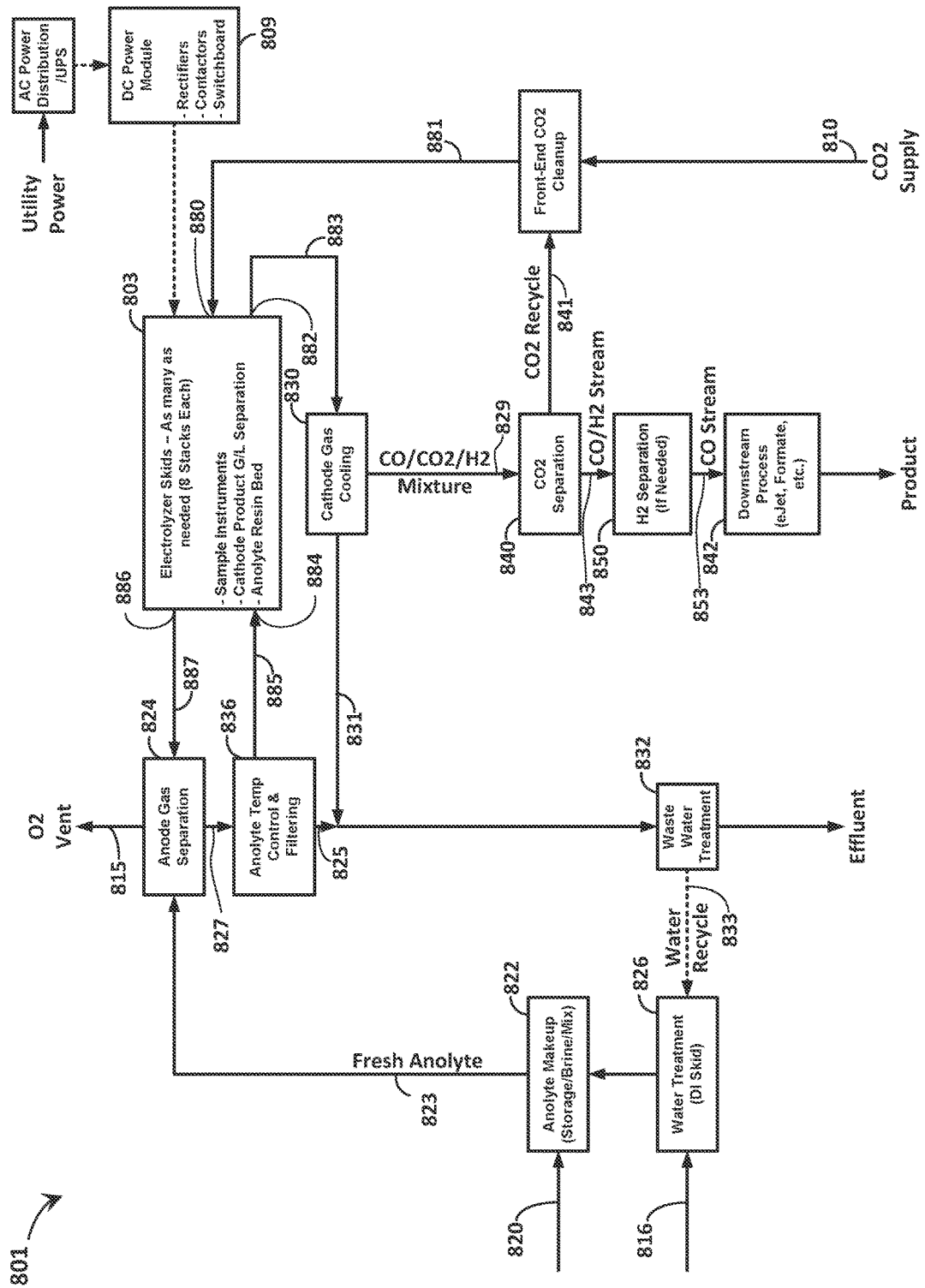
FIG. 4B is a schematic diagram of a system including a plurality of carbon oxide reduction reactors.

FIG. 4B provides a schematic diagram illustrating a non-limiting example of a carbon dioxide reduction system including a plurality of carbon dioxide reduction reactors. The system may be employed to electrochemically produce carbon monoxide from carbon dioxide, in one embodiment. For example, as shown, system 801 can include carbon dioxide reduction reactor assembly 803 containing multiple carbon dioxide reduction reactor(s) (i.e., electrolyzer skid(s)). Each of the skids can include multiple electrolyzer stacks, and each stack can contain multiple individual electrolyzer reduction cells (e.g., at least 50, at least 100, etc.).

The carbon dioxide reduction reactor assembly 803 can include multiple carbon dioxide reduction reactors or skids. According to some embodiments, at least one (or each) electrolyzer skid can be coupled to a corresponding power module and may comprise additional components such as ion exchange resin bed, filter, catholyte sample separator, catholyte product gas separator, anolyte sample separator, and various instrumentation and controls surrounding the components may also be present. For example, the electrolyzer skid can include sample separators and gas analyzers for both the anolyte and catholyte to allow measurement of individual stack performance. Specifically, on the anolyte side, anolyte gas analyzer can serve as an important piece of safety instrumentation to monitor the presence and/or concentration of a flammable gas. Similarly, on the cathode side, a cathode gas analyzer can be used to measure individual stack cathode gas concentrations to monitor stack performance.

Referring back to FIG. 4B, the cathode gas may include primarily $CO_2$, which can include both pure makeup $CO_2$ and optionally recycled $CO_2$ from downstream processes. During operation, cathode gas can be fed to the electrolyzer skid(s) via stream 881, where the $CO_2$ can be converted to CO and some $H_2$ can be produced along with a small amount of formic acid and water (e.g., water that migrate from the anode side of the membranes). This $CO_2/CO/H_2$/liquid mixture 883 can then be transported from electrolyzer outlet 882 to cathode gas/liquid separator 830 to remove the bulk liquid, which can be sent to downstream wastewater treatment system 832 (i.e., a cathode water tank). The gas from the cathode separator 830 can be sent through a gas chiller and coalescing filter to remove any remaining humidity from the gas stream. In some cases, the $CO_2/CO/H_2$ mixture stream 829 exiting cathode gas/liquid separator 830 may be input into $CO_2$ separator 840 to separate $CO_2$ from the mixture. The separated $CO_2$ stream may be recycled via stream 841, combined with $CO_2$ makeup stream 810 from a $CO_2$ source, and subsequently fed to inlet 880 of electrolyzer skid 803 via stream 881. Separated $CO_2/H_2$ mixture stream 843 may be subsequently passed into $H_2$ separator 850 to separate $H_2$ from the mixture. A relatively pure CO stream 853 may be produced and sent to any of a variety of appropriate downstream units (e.g., unit 842), such as an aluminum production subsystem described elsewhere herein.

Furthermore, as shown in FIG. 4B, during operation, electricity can be converted by one or more rectifiers in power module 809 from site AC supply to DC current to power the stacks in the skid. In some cases, each individual stack can be coupled to a single rectifier for precise control. Alternatively, multiple stacks may be coupled to a single rectifier.

Referring again to FIG. 4B, the anolyte feed may include a mixture of DI water and a salt (e.g., potassium bicarbonate salt), which can be dosed into the DI water to achieve a desired conductivity described elsewhere herein (e.g., at least 200 μS/cm and no more than 3000 μS/cm, at least 100 μS/cm and no more than 1000 μS/cm, or at least 300 μS/cm and no more than 800 μS/cm, at least 600 μS/cm and no more than 1000 μS/cm, or at least 100 μS/cm and no more than 600 μS/cm). Fresh DI water and brine solution can be added continuously (as needed) to separator tank 824 to maintain anolyte level and conductivity.

As shown in FIG. 4B, anolyte input 885 may include fresh anolyte makeup (DI water) from fresh anolyte source 816 (e.g., DI water source), optionally recycled anolyte 825 (e.g., anode water) from electrolyzer outlet 886, and optionally recovered cathode liquid output 831 (e.g., water contained within reduction product stream 883) from cathode separator 830. These streams may be combined into an anolyte feed stream at water treatment skid 826. Salt or ions from a source of salt or ions 820 may be dosed into the anolyte feed at mix tank 822 to achieve the desired conductivity and/or salt concentration before introducing the anolyte feed into electrolyzer inlet 884. In one set of embodiments, anolyte feed 823 may be fed to anolyte separator 824 where it is combined with anolyte outlet stream 887 recycled from outlet 886 of electrolyzer assembly 803. During operation, the anolyte separator may be configured to separate anolyte 827 (e.g., anode water) from oxidation products 815 (e.g., oxygen gas) present in anolyte outlet stream 887. At least a portion of separator outlet stream 827 may be then pumped into temperature control unit 836 prior to being introduced into inlet 884 of electrolyzer skid 803 as anolyte input 885, as described in more detail below. While FIG. 4B shows an embodiment in which anolyte feed 823 is introduced into anode separator 824 prior to being introduced into temperature control unit 836, it should be understood that the disclosure is not so limited and that in certain embodiments, anolyte feed 823 may be introduced directly into temperature control unit 836.

In some cases, the above-referenced temperature control system may include one or more temperature sensors, one or more heating devices, one or more cooling devices, one or more pressurizing systems or pressure-control systems (such as pumps and/or valves), one or more feedback controllers, and/or one or more flow controls, according to some embodiments. In some cases, the heating and/or cooling devices may include one or more heat exchanger(s). In some embodiments, the one or more pressurizing systems include one or more pumps. In some cases, the one or more pumps may be configured to control an anode inlet flow rate of the anolyte solution provided to the electrolyzer skid(s). In some embodiments, the temperature control unit may be configured to control an anode inlet temperature of the anolyte input provided to the electrolyzer skid(s) and/or the temperature differential across individual stacks within the skid(s).

In one set of embodiments, the anolyte can be pumped from anolyte separator 824 through a filter to a cooler (within temperature control unit 836) before being sent to the electrolyzer skid. The filter can remove any particles which could cause plugging or other mechanical damage to downstream equipment. The cooler can be used to maintain the anolyte loop temperature during normal operation, by removing the heat imparted from the stacks to the anolyte. At each individual stack, anolyte flow can be controlled by cascade from the temperature differential on the anode side between the anode inlet and the anode outlet. In some cases, the anolyte pumps and coolers can be sized to maintain a relatively small temperature differential (e.g., no more than 5° C., no more than 3° C., no more than 1.5° C., no more than 1° C., etc.) with all stacks on average operating at about 75% of lifetime (e.g., about 85%, about 95%, etc.), which is expected to be advantageous for stack performance.

In some cases, a heater can be used to increase the temperature of anolyte during startup, and a cooler can be used to cool the anolyte during normal operation. In some embodiments, by controlling one or more components within the temperature control system (e.g., pressurizing units, cooling and/or heating devices, etc.), the temperature of the anolyte input (e.g., input 885 as shown in FIG. 4B) may be maintained to be within a predetermined temperature range, such as at least 10° C. and no more than 80° C., at least 10° C. and no more than 66° C., at least 20° C. and no more than 60° C., at least 30° C. and no more than 65° C., at least 35° C. and no more than 45° C., at least 35° C. and no more than 40° C., etc.

MEA Embodiments
MEA Overview

In various embodiments, an MEA contains an anode layer, a cathode layer, electrolyte, and optionally one or more other layers. The layers may be solids and/or gels. Any one or more of the MEA layers may include polymers such as ion-conducting polymers.

When in use, the cathode of an MEA promotes electrochemical reduction of $CO_x$ by combining three inputs: $CO_x$, ions (e.g., hydrogen ions, hydroxide ions, or bicarbonate ions) that chemically react with the $CO_x$ ions, and electrons. The reduction reaction may produce CO, hydrocarbons, and/or hydrogen and oxygen-containing organic compounds such as methanol, ethanol, and acetic acid. When in use, the anode of an MEA promotes an electrochemical oxidation reaction such as electrolysis of water to produce elemental oxygen and protons. The cathode and anode may each contain catalysts to facilitate their respective reactions.

During operation of an MEA, ions move through one or more polymer layers that serve as the electrolyte, while electrons flow from an anode, through an external circuit, and to a cathode. In some embodiments, liquids and/or gas move through or permeates the MEA layers. This process may be facilitated by pores in one or more layers of the MEA.

The compositions and arrangements of layers in the MEA may promote high yield of a $CO_x$ reduction products. To this end, the MEA may facilitate any one or more of the following conditions: (a) minimal parasitic reduction reactions (non-$CO_x$ reduction reactions) at the cathode; (b) low loss of $CO_x$ reactants to the anode or elsewhere in the MEA; (c) physical integrity of the MEA during the reaction (e.g., the MEA layers remain affixed to one another); (d) prevent $CO_x$ reduction product cross-over; (e) prevent oxidation product (e.g., $O_2$) cross-over; (f) a suitable environment at the cathode for the reduction reaction; (g) a pathway for desired ions to travel between cathode and anode while blocking undesired ions; and (h) low voltage operation.

$CO_x$ Reduction Considerations

For many applications, an MEA for $CO_x$ reduction requires a lifetime on the order of about 50,000 hours or longer (approximately five years of continuous operation), which is significantly longer than the expected lifespan of a fuel cell for automotive applications, which are often on the order of 5,000 hours. And for various applications, an MEA for $CO_x$ reduction employs electrodes having a relatively large surface area by comparison to MEAs used for fuel cells in automotive applications. For example, MEAs for $CO_x$ reduction may employ electrodes having surface areas (without considering pores and other nonplanar features) of at least about 500 $cm^2$.

$CO_x$ reduction reactions may be implemented in operating environments that facilitate mass transport of particular reactant and product species, as well as to suppress parasitic reactions. Fuel cell and water electrolyzer MEAs often cannot produce such operating environments. For example, such MEAs may promote undesirable parasitic reactions such as gaseous hydrogen evolution at the cathode and/or gaseous $CO_2$ production at the anode.

In some systems, the rate of a $CO_x$ reduction reaction is limited by the availability of gaseous $CO_x$ reactant at the cathode. By contrast, the rate of water electrolysis is not significantly limited by the availability of reactant: liquid water tends to be easily accessible to the cathode and anode, and electrolyzers can operate close to the highest current density possible.

MEA Configurations

In certain embodiments, an MEA has a cathode layer, an anode layer, and a polymer electrolyte membrane (PEM) between the anode layer and the cathode layer. The polymer electrolyte membrane provides ionic communication between the anode layer and the cathode layer, while preventing electronic communication that would produce a short circuit. The cathode layer includes a reduction catalyst and, optionally, an ion-conducting polymer (sometimes called an ionomer). The cathode layer may also include an electron conductor and/or an additional ion conductor. The anode layer includes an oxidation catalyst and, optionally, an ion-conducting polymer. The anode layer may also include an electron conductor and/or an additional ion conductor. The PEM comprises an ion-conducting polymer. In certain embodiments, the MEA has a cathode buffer layer between the cathode layer and the polymer electrolyte membrane. The cathode buffer comprises an ion-conducting polymer.

The ion-conducting polymers in the PEM, the cathode, the anode, and the cathode buffer layer, if present, may each be different from one another in composition, conductivity, molecular weight, or other property. In some cases, two or more of these polymers are identical or substantially identical. For example, the ion-conducting polymer in the cathode and cathode buffer layer may be identical.

In certain embodiments, the MEA has an anode buffer layer between the anode layer and the polymer electrolyte membrane. The anode buffer layer also comprises an ion-conducting polymer, which may have the same properties as any of the other ion-conducting polymers (e.g., the ion-conducting polymer in the anode). Or the ion-conducting layer of the anode buffer layer may be different from every other ion-conducting layer in the MEA.

In connection with certain MEA designs, the polymers in the layers may be chosen from among three available classes of ion-conducting polymers: anion-conductors, cation-conductors, and mixed cation-and-anion-conductors. In certain embodiments, at least two of the ion-conducting polymers are from different classes of ion-conducting polymers.

In certain embodiments, an MEA has a bipolar interface, which means that it has one layer of anion-conducting polymer in contact with a layer of cation-conducting polymer. One example of an MEA with a bipolar interface is an anion-conducting cathode buffer layer adjacent to (and in contact with) a cation-conducting PEM. In certain embodiments, an MEA contains only anion-conducting polymer between the anode and the cathode. Such MEAs are sometimes referred to as "AEM only" MEAs. Such MEAs may contain one or more layers of anion-conducing polymer between the anode and the cathode.

Ion-conducting polymers for MEA layers

The term "ion-conducting polymer" or "ionomer" is used herein to describe a polymer that conducts ions (anions and/or cations) is to say that the material is an ion-conducting material or ionomer. In certain embodiments, an MEA contains one or more ion-conducting polymers having a specific conductivity of about 1 mS/cm or greater for anions and/or cations. The term "anion-conductor" describes an ion-conducting polymer that conducts anions primarily (although there will still be some small amount of cation conduction) and has a transference number for anions of about 0.85 or greater at around 100 micrometers thickness. The terms "cation-conductor" and/or "cation-conducting polymer" describe an ion-conducting polymer that conducts cations primarily (e.g., there can still be an incidental amount of anion conduction) and has a transference number for cations of about 0.85 or greater at about 100 micrometers thickness. For an ion-conducting polymer that is described as conducting both anions and cations (a "cation-and-anion-conductor"), neither the anions nor the cations have a transference number greater than about 0.85 or less than about 0.15 at about 100 micrometers thickness. Examples of ion-conducting polymers of each class are provided in the below Table 1.

| Ion-Conducting Polymers | | | |
|---|---|---|---|
| Class | Description | Common Features | Examples |
| A. Anion-conducting | Greater than approximately 1 mS/cm specific conductivity for anions, which have a transference number greater than approximately 0.85 at about 100 micron thickness | Positively charged functional groups are covalently bound to the polymer backbone | Quaternary ammonium or cyclic amine moieties on polyphenylene backbone; aminated tetramethyl polyphenylene; poly(ethylene-co-tetrafluoroethylene)-based quaternary ammonium polymer; quaternized polysulfone |
| B. Conducts both anions and cations | Greater than approximately 1 mS/cm conductivity for ions (including both cations and anions), which have a transference number between approximately 0.15 and 0.85 at around 100 micron thickness | Salt is soluble in the polymer and the salt ions can move through the polymer material | polyethylene oxide; polyethylene glycol; poly(vinylidene fluoride); polyurethane |
| C. Cation-conducting | Greater than approximately 1 mS/cm specific conductivity for cations, which have a transference number greater than approximately 0.85 at around 100 micron thickness | Negatively charged functional groups are covalently bound to the polymer backbone | perfluorosulfonic acid polytetrafluoroethylene co-polymer; sulfonated poly(ether ketone); poly(styrene sulfonic acid- co-maleic acid) |

Polymeric Structures

Examples of polymeric structures that can include an ionizable moiety or an ionic moiety and be used as ion-conducting polymers (ionomers) in the MEAs described here are provided below. The ion-conducting polymers may be used as appropriate in any of the MEA layers that include an ion-conducting polymer. Charge conduction through the material can be controlled by the type and amount of charge (e.g., anionic and/or cationic charge on the polymeric structure) provided by the ionizable/ionic moieties. In addition, the composition can include a polymer, a homopolymer, a copolymer, a block copolymer, a polymeric blend, other polymer-based forms, or other useful combinations of repeating monomeric units. As described below, an ion conducting polymer layer may include one or more of crosslinks, linking moieties, and arylene groups according to various embodiments. In some embodiments, two or more ion conducting polymers (e.g., in two or more ion conducting polymer layers of the MEA) may be crosslinked.

Non-limiting monomeric units can include one or more of the following:

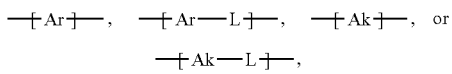

in which Ar is an optionally substituted arylene or aromatic; Ak is an optionally substituted alkylene, haloalkylene, aliphatic, heteroalkylene, or heteroaliphatic; and L is a linking moiety (e.g., any described herein) or can be —C(R$^7$)(R$^8$)—. Yet other non-limiting monomeric units can include optionally substituted arylene, aryleneoxy, alkylene, or combinations thereof, such as optionally substituted (aryl)(alkyl)ene (e.g., -Ak-Ar- or -Ak-Ar-Ak- or -Ar-Ak-, in which Ar is an optionally substituted arylene and Ak is an optionally substituted alkylene). One or more monomeric units can be optionally substituted with one or more ionizable or ionic moieties (e.g., as described herein).

One or more monomeric units can be combined to form a polymeric unit. Non-limiting polymeric units include any of the following:

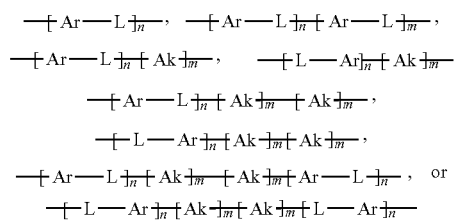

in which Ar, Ak, L, n, and m can be any described herein. In some embodiments, each m is independently 0 or an integer of 1 or more. In other embodiments, Ar can include two or more arylene or aromatic groups.

Other alternative configurations are also encompassed by the compositions herein, such as branched configurations, diblock copolymers, triblock copolymers, random or statistical copolymers, stereoblock copolymers, gradient copolymers, graft copolymers, and combinations of any blocks or regions described herein.

Examples of polymeric structures include those according to any one of formulas (I)-(V) and (X)-(XXXIV), or a salt thereof. In some embodiments, the polymeric structures are copolymers and include a first polymeric structure selected from any one of formulas (I)-(V) or a salt thereof; and a second polymeric structure including an optionally substituted aromatic, an optionally substituted arylene, a structure selected from any one of formulas (I)-(V) and (X)-(XXXIV), or a salt thereof.

In one embodiment, the MW of the ion-conducting polymer is a weight-average molecular weight (Mw) of at least 10,000 g/mol; or from about 5,000 to 2,500,000 g/mol. In another embodiment, the MW is a number average molecular weight (Mn) of at least 20,000 g/mol; or from about 2,000 to 2,500,000 g/mol.

In any embodiment herein, each of n, n1, n2, n3, n4, m, m1, m2, or m3 is, independently, 1 or more, 20 or more, 50 or more, 100 or more; as well as from 1 to 1,000,000, such as from 10 to 1,000,000, from 100 to 1,000,000, from 200 to 1,000,000, from 500 to 1,000,000, or from 1,000 to 1,000,000.

Non-limiting polymeric structures can include the following:

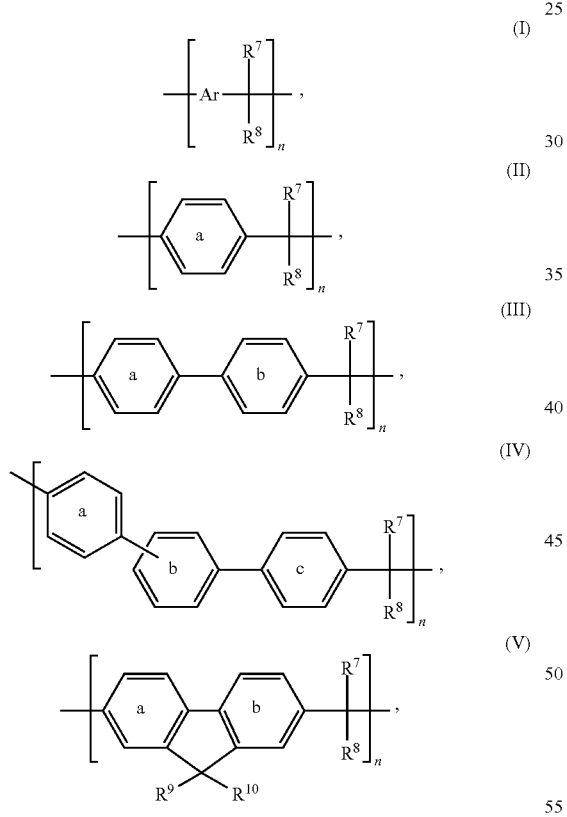

or a salt thereof, wherein:
  each of $R^7$, $R^8$, $R^9$, and $R^{10}$ is, independently, an electron-withdrawing moiety, H, optionally substituted aliphatic, alkyl, heteroaliphatic, heteroalkylene, aromatic, aryl, or arylalkylene, wherein at least one of $R^7$ or $R^8$ can include the electron-withdrawing moiety or wherein a combination of $R^7$ and $R^8$ or $R^9$ and $R^{10}$ can be taken together to form an optionally substituted cyclic group;
  Ar comprises or is an optionally substituted aromatic or arylene (e.g., any described herein);
  each of n is, independently, an integer of 1 or more;
  each of rings a-c can be optionally substituted; and
  rings a-c, $R^7$, $R^8$, $R^9$, and $R^{10}$ can optionally comprise an ionizable or ionic moiety.

Further non-limiting polymeric structures can include one or more of the following:

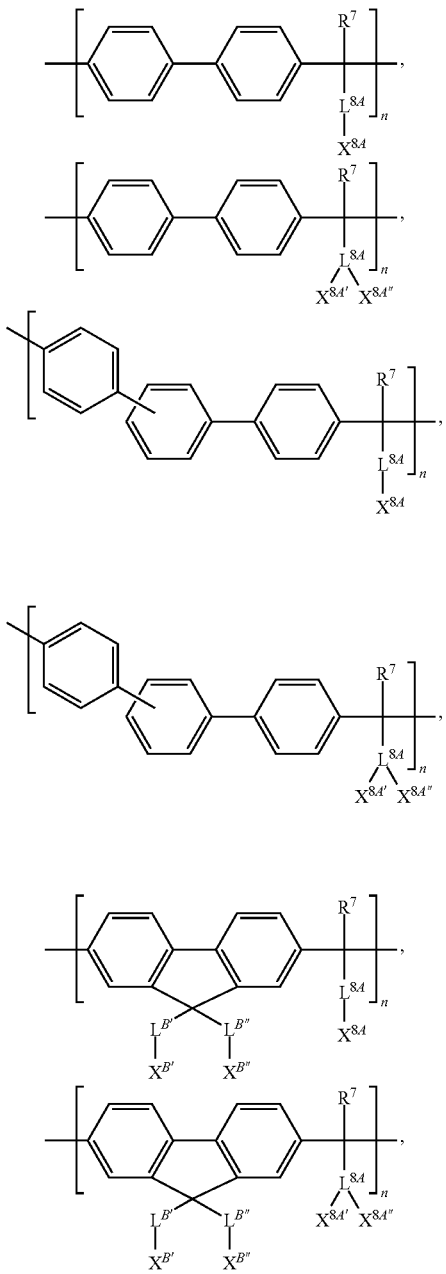

or a salt thereof, wherein:
  $R^7$ can be any described herein (e.g., for formulas (I)-(V));
  n is from 1 or more;
  each $L^{8A}$, $L^{B'}$, and $L^{B''}$ is, independently, a linking moiety; and
  each $X^{8A}$, $X^{8A'}$, $X^{8A''}$, $X^{B'}$, and $X^{B''}$ is, independently, an ionizable or ionic moiety.

Yet other polymeric structures include the following:
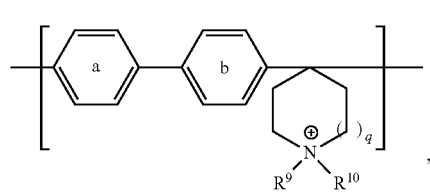           (X)
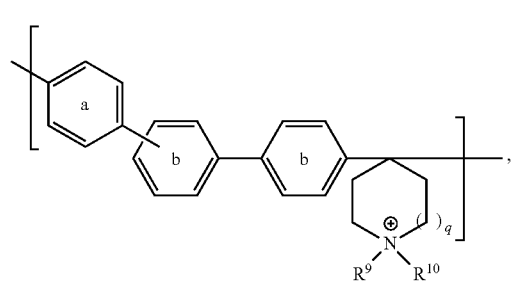           (XI)
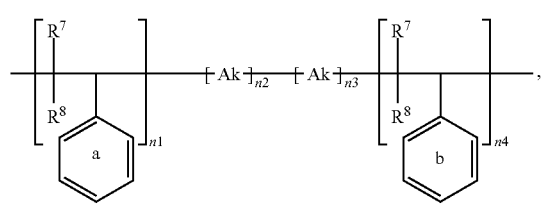           (XII)
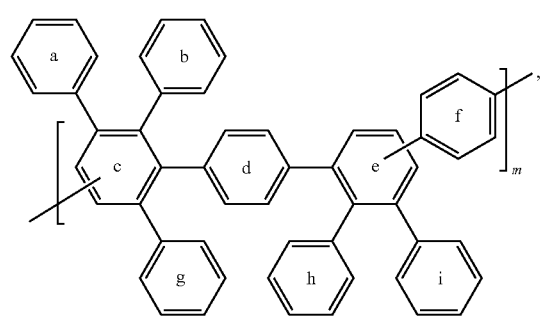           (XIII)
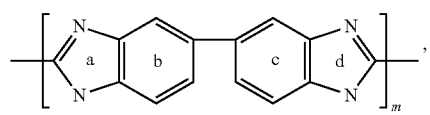           (XIV)
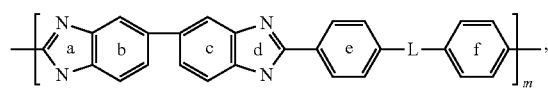           (XV)
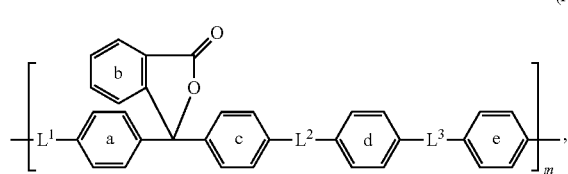           (XVI)
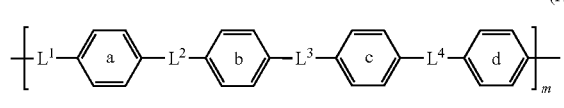           (XVII)
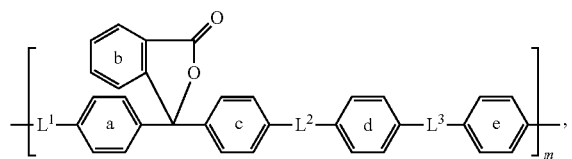           (XVIII)
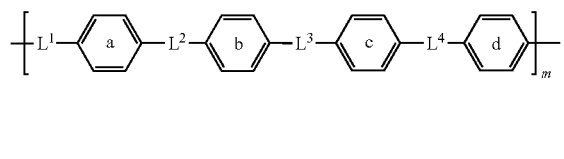          (XIX)
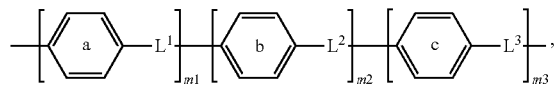          (XX)
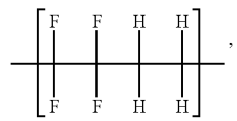          (XXI)
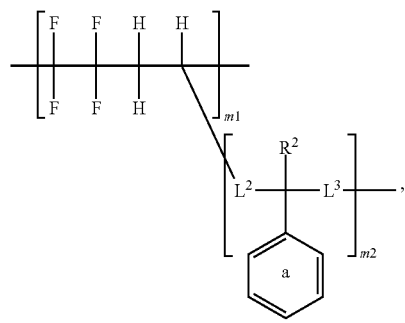

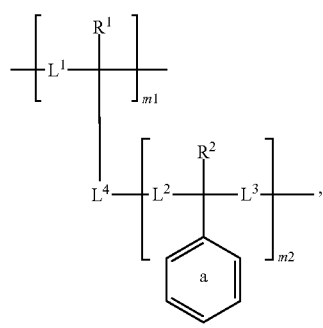
(XXII)

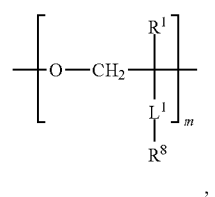
(XXIII)

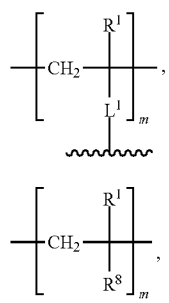
(XXIV)

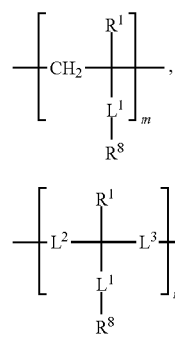
(XXV)

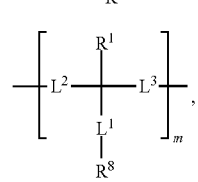
(XXVI)

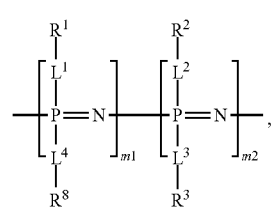
(XXVII)

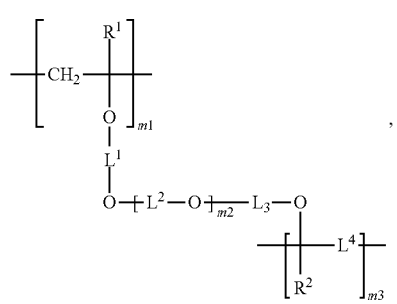
(XXVIII)

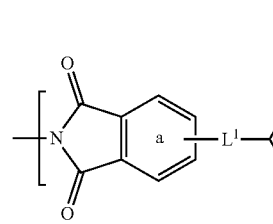
(XXIX)

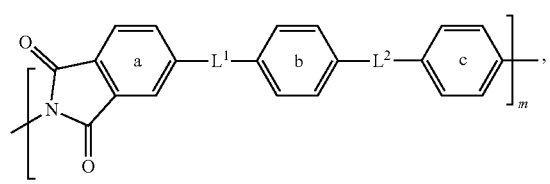
(XXX)

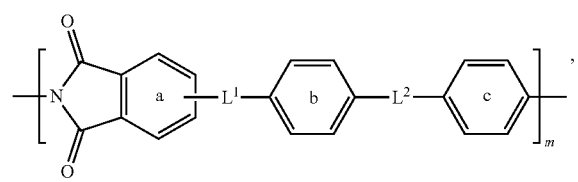
(XXXI)

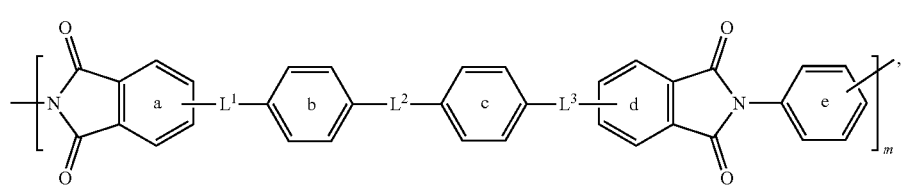
(XXXII)

(XXXIII)

(XXXIV)

or a salt thereof, wherein:

each of $R^1$, $R^2$, $R^3$, $R^7$, $R^8$, $R^9$, and $R^{10}$ is, independently, an electron-withdrawing moiety, H, optionally substituted aliphatic, alkyl, heteroaliphatic, heteroalkylene, aromatic, aryl, or arylalkylene, wherein at least one of $R^7$ or $R^8$ can include the electron-withdrawing moiety or wherein a combination of $R^7$ and $R^8$ or $R^9$ and $R^{10}$ can be taken together to form an optionally substituted cyclic group;

each Ak is or comprises an optionally substituted aliphatic, alkylene, haloalkylene, heteroaliphatic, or heteroalkylene;

each Ar is or comprises an optionally substituted arylene or aromatic;

each of L, $L^1$, $L^2$, $L^3$, and $L^4$ is, independently, a linking moiety;

each of n, $n^1$, $n^2$, $n^3$, $n^4$, m, $m^1$, $m^2$, and $m^3$ is, independently, an integer of 1 or more;

q is 0, 1, 2, or more;

each of rings a-i can be optionally substituted; and rings a-i, $R^7$, $R^8$, $R^9$, and $R^{10}$ can optionally include an ionizable or ionic moiety.

In particular embodiments (e.g., of formula (XIV) or (XV)), each of the nitrogen atoms on rings a and/or b are substituted with optionally substituted aliphatic, alkyl, aromatic, aryl, an ionizable moiety, or an ionic moiety. In some embodiments, one or more hydrogen or fluorine atoms (e.g., in formula (XIX) or (XX)) can be substituted to include an ionizable moiety or an ionic moiety (e.g., any described herein). In other embodiments, the oxygen atoms present in the polymeric structure (e.g., in formula XXVIII) can be associated with an alkali dopant (e.g., $K^+$).

In particular examples, Ar, one or more of rings a-i (e.g., rings a, b, f, g, h, or i), L, $L^1$, $L^2$, $L^3$, $L^4$, Ak, $R^7$, $R^8$, $R^9$, and/or $R^{10}$ can be optionally substituted with one or more ionizable or ionic moieties and/or one or more electron-withdrawing groups. Yet other non-limiting substituents for Ar, rings (e.g., rings a-i), L, Ak, $R^7$, $R^8$, $R^9$, and $R^{10}$ include one or more described herein, such as cyano, hydroxy, nitro, and halo, as well as optionally substituted aliphatic, alkyl, alkoxy, alkoxyalkyl, amino, aminoalkyl, aryl, arylalkylene, aryloyl, aryloxy, arylalkoxy, hydroxyalkyl, and haloalkyl.

In some embodiments, each of $R^1$, $R^2$, and $R^3$ is, independently, H, optionally substituted aromatic, aryl, aryloxy, or arylalkylene. In other embodiments (e.g., of formulas (I)-(V) or (XII)), $R^7$ includes the electron-withdrawing moiety. In yet other embodiments, $R^8$, $R^9$, and/or $R^{10}$ includes an ionizable or ionic moiety.

In one instance, a polymeric subunit can lack ionic moieties. Alternatively, the polymeric subunit can include an ionic moiety on the Ar group, the L group, both the Ar and L groups, or be integrated as part of the L group. Non-limiting examples of ionizable and ionic moieties include cationic, anionic, and multi-ionic group, as described herein.

In any embodiment herein, the electron-withdrawing moiety can include or be an optionally substituted haloalkyl, cyano (CN), phosphate (e.g., —O(P═O) $(OR^{P1})$ $(OR^{P2})$ or —O—[P(═O)$(OR^{P1})$—O]$_{P3}$—$R^{P2}$), sulfate (e.g., —O—S (═O)$_2$$(OR^{S1})$), sulfonic acid (—$SO_3H$), sulfonyl (e.g., —$SO_2$—$CF_3$), difluoroboranyl (—$BF_2$), borono (B$(OH)_2$), thiocyanato (—SCN), or piperidinium. Yet other non-limiting phosphate groups can include derivatives of phosphoric acid, such as orthophosphoric acid, pyrophosphoric acid, tripolyphosphoric acid, tetrapolyphosphoric acid, trimetaphosphoric acid, and/or phosphoric anhydride, or combinations thereof.

Yet other polymeric units can include poly(benzimidazole) (PBI), polyphenylene (PP), polyimide (PI), poly(ethylencimine) (PEI), sulfonated polyimide (SPI), polysulfone (PSF), sulfonated polysulfone (SPSF), poly(ether ketone) (PEEK), PEEK with cardo groups (PEEK-WC), polyethersulfone (PES), sulfonated polyethersulfone (SPES), sulfonated poly(ether ketone) (SPEEK), SPEEK with cardo groups (SPEEK-WC), poly(p-phenylene oxide) (PPO), sulfonated polyphenylene oxide (SPPO), ethylene tetrafluoroethylene (ETFE), polytetrafluoroethylene (PTFE), poly (epichlorohydrin) (PECH), poly(styrene) (PS), sulfonated poly(styrene) (SPS), hydrogenated poly(butadiene-styrene) (HPBS), styrene divinyl benzene copolymer (SDVB), styrene-ethylene-butylene-styrene (SEBS), sulfonated bisphenol-A-polysulfone (SPSU), poly(4-phenoxy benzoyl-1,4-phenylene) (PPBP), sulfonated poly(4-phenoxy benzoyl-1,4-phenylene) (SPPBP), poly(vinyl alcohol) (PVA), poly (phosphazene), poly(aryloxyphosphazene), polyetherimide, as well as combinations thereof.

Bipolar MEA for $CO_x$ Reduction

In certain embodiments, the MEA includes a bipolar interface having an anion-conducting polymer on the cathode side of the MEA and an interfacing cation-conducting polymer on the anode side of the MEA. In some implementations, the cathode contains a first catalyst and an anion-conducting polymer. In certain embodiments, the anode contains a second catalyst and a cation-conducting polymer. In some implementations, a cathode buffer layer, located between the cathode and PEM, contains an anion-conducting polymer. In some embodiments, an anode buffer layer, located between the anode and PEM, contains a cation-conducting polymer.

In embodiments employing an anion-conducting polymer in the cathode and/or in a cathode buffer layer, the MEA can decrease or block unwanted reactions that produce undesired products and decrease the overall efficiency of the cell. In embodiments employing a cation-conducting polymer in the anode and/or in an anode buffer layer can decrease or block un wanted reactions that reduce desired product production and reduce the overall efficiency of the cell.

For example, at levels of electrical potential used for cathodic reduction of $CO_2$, hydrogen ions may be reduced to hydrogen gas. This is a parasitic reaction; current that could be used to reduce $CO_2$ is used instead to reduce hydrogen ions. Hydrogen ions may be produced by various oxidation reactions performed at the anode in a $CO_2$ reduction reactor and may move across the MEA and reach the cathode where they can be reduced to produce hydrogen gas. The extent to which this parasitic reaction can proceed is a function of the concentration of hydrogen ions present at the cathode. Therefore, an MEA may employ an anion-conducting material in the cathode layer and/or in a cathode buffer layer. The anion-conducting material at least partially blocks hydrogen ions from reaching catalytic sites on the cathode. As a result, parasitic production of hydrogen gas decreases and the rate of production of CO or other carbon-containing product increases.

Another reaction that may be avoided is reaction of carbonate or bicarbonate ions at the anode to produce $CO_2$. Aqueous carbonate or bicarbonate ions may be produced from $CO_2$ at the cathode. If such ions reach the anode, they may react with hydrogen ions to produce and release gaseous $CO_2$. The result is net movement of $CO_2$ from the cathode to the anode, where it does not get reduced and is lost with oxidation products. To prevent the carbonate and bicarbonate ion produced at the cathode from reaching the anode, the anode and/or an anode buffer layer may include a cation-conducting polymer, which at least partially blocks the transport of negative ions such as bicarbonate ions to the anode.

Thus, in some designs, a bipolar membrane structure raises the pH at the cathode to facilitate $CO_2$ reduction while a cation-conducting polymer such as a proton-exchange layer prevents the passage of significant amounts of $CO_2$ and $CO_2$ reduction products (e.g., bicarbonate) to the anode side of the cell.

Figure 5:
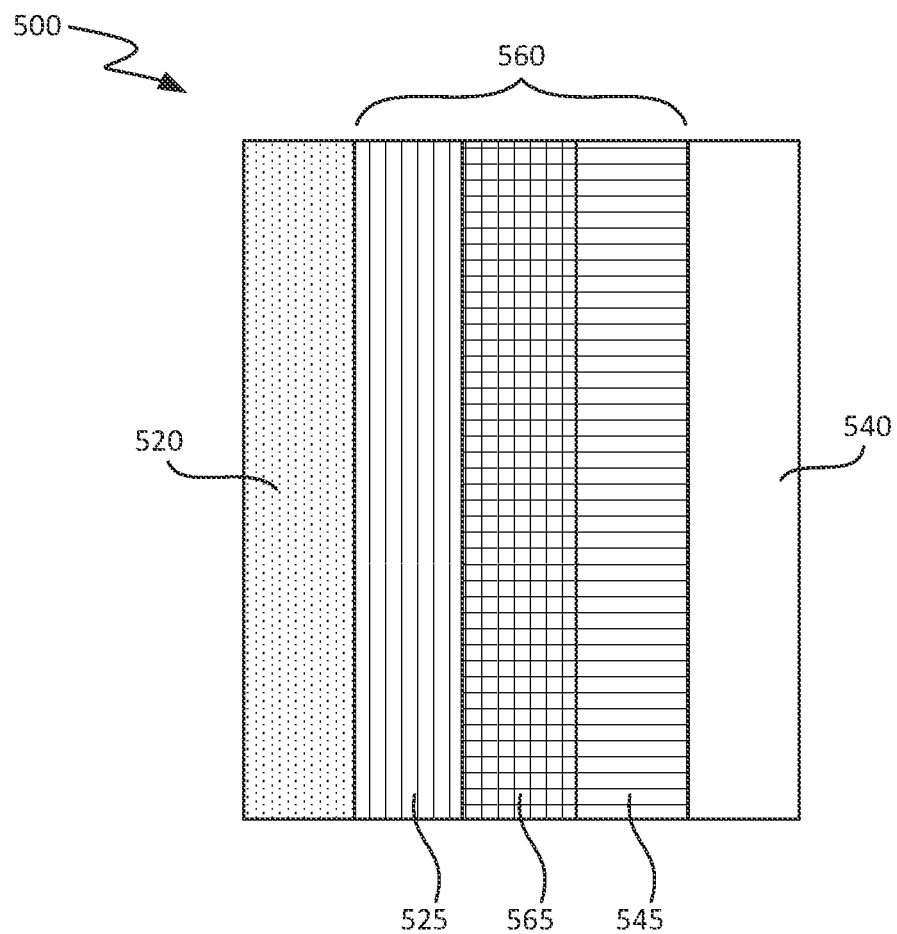
FIG. 5 depicts an example MEA for use in $CO_x$ reduction. The MEA has a cathode layer and an anode layer separated by an ion-conducting polymer layer.

An example MEA 500 for use in $CO_x$ reduction is shown in FIG. 5. The MEA 500 has a cathode layer 520 and an anode layer 540 separated by an ion-conducting polymer layer 560 that provides a path for ions to travel between the cathode layer 520 and the anode layer 540. In certain embodiments, the cathode layer 520 includes an anion-conducting polymer and/or the anode layer 540 includes a cation-conducting polymer. In certain embodiments, the cathode layer and/or the anode layer of the MEA are porous. The pores may facilitate gas and/or fluid transport and may increase the amount of catalyst surface area that is available for reaction.

The ion-conducting layer 560 may include two or three sublayers: a polymer electrolyte membrane (PEM) 565, an optional cathode buffer layer 525, and/or an optional anode buffer layer 545. One or more layers in the ion-conducting layer may be porous. In certain embodiments, at least one layer is nonporous so that reactants and products of the cathode cannot pass via gas and/or liquid transport to the anode and vice versa. In certain embodiments, the PEM layer 565 is nonporous. Example characteristics of anode buffer layers and cathode buffer layers are provided elsewhere herein. In certain embodiments, the ion-conducting layer includes only a single layer or two sublayers.

In some embodiments, a carbon oxide electrolyzer anode contains a blend of oxidation catalyst and an ion-conducting polymer. There are a variety of oxidation reactions that can occur at the anode depending on the reactant that is fed to the anode and the anode catalyst(s). In one arrangement, the oxidation catalyst is selected from the group consisting of metals and oxides of Ir, Pt, Ni, Ru, Pd, Au, and alloys thereof, IrRu, PtIr, Ni, NiFe, stainless steel, and combinations thereof. The oxidation catalyst can further contain conductive support particles such as carbon, boron-doped diamond, titanium, and any combination thereof.

As examples, the oxidation catalyst can be in the form of a structured mesh or can be in the form of particles. If the oxidation catalyst is in the form of particles, the particles can be supported by electronically conductive support particles. The conductive support particles can be nanoparticles. The conductive support particles may be compatible with the chemicals that are present in an electrolyzer anode when the electrolyzer is operating and are oxidatively stable so that they do not participate in any electrochemical reactions. It is especially useful if the conductive support particles are chosen with the voltage and the reactants at the anode in mind. In some arrangements, the conductive support particles are titanium, which is well-suited for high voltages. In other arrangements, the conductive support particles are carbon, which can be most useful at low voltages. In some embodiments, such conductive support particles are larger than the oxidation catalyst particles, and each conductive support particle can support one or more oxidation catalyst particles. In one arrangement, the oxidation catalyst is iridium ruthenium oxide. Examples of other materials that can be used for the oxidation catalyst include, but are not limited to, those listed above. It should be understood that many of these metal catalysts can be in the form of oxides, especially under reaction conditions.

As mentioned, in some embodiments, an anode layer of an MEA includes an ion-conducting polymer. In some cases, this polymer contains one or more covalently bound, negatively charged functional groups configured to transport mobile positively charged ions. Examples of the second ion-conducting polymer include ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof. Commercially available examples of cation-conducting polymers include e.g., Nafion 115, Nafion 117, and/or Nafion 211. Other examples of cationic conductive ionomers described above are suitable for use in anode layers. Further examples of polymer backbones and pendant groups suitable for use in the ion-conducting polymer of the anode layer are describes above.

There may be tradeoffs in choosing the amount of ion-conducting polymer in the anode. For example, an anode may include enough anode ion-conducting polymer to provide sufficient ionic conductivity, while being porous so that reactants and products can move through it easily. An anode may also be fabricated to maximize the amount of catalyst surface area that is available for reaction. In various arrangements, the ion-conducting polymer in the anode makes up about 10 and 90 wt %, or about 20 and 80 wt %, or about 25 and 70 wt % of the total anode mass. As an example, the ion-conducting polymer may make up about 5 and 20 wt % of the anode. In certain embodiments, the anode may be configured to tolerate relatively high voltages, such as voltages above about 1.2 V vs. a reversible hydrogen electrode. In some embodiments, an anode is porous in order to maximize the amount of catalyst surface area available for reaction and to facilitate gas and liquid transport.

In one example of a metal catalyst, Ir or IrOx particles (100-200 nm) and Nafion ionomer form a porous layer approximately 10 μm thick. Metal catalyst loading is approximately 0.5-3 g/cm$^2$. In some embodiments, NiFeOx is used for basic reactions.

In some embodiments, the MEA and/or the associated cathode layer is designed or configured to accommodate gas generated in situ. Such gas may be generated via various mechanisms. For example, carbon dioxide may be generated when carbonate or bicarbonate ions moving from the cathode toward the anode encounter hydrogen ions moving from the anode toward the cathode. This encounter may occur, for example, at the interface of anionic and cationic conductive ionomers in a bipolar MEA. Alternatively, or in addition, such contact may occur at the interface of a cathode layer and a polymer electrolyte membrane. For example, the polymer electrolyte membrane may contain a cationic conductive ionomer that allows transport of protons generated at the anode. The cathode layer may include an anion conductive ionomer.

Left unchecked, the generation of carbon dioxide or other gas may cause the MEA to delaminate or otherwise be damaged. It may also prevent a fraction of the reactant gas from being reduced at the anode.

The location within or adjacent to an MEA where a gas such as carbon dioxide is generated in situ may contain one or more structures designed to accommodate such gas and, optionally, prevent the gas from reaching the anode, where it would be otherwise unavailable to react.

In certain embodiments, pockets or voids are provided at a location where the gas is generated. These pockets or voids may have associated pathways that allow the generated gas to exit from the MEA, optionally to the cathode where, for example, carbon dioxide can be electrochemically reduced. In certain embodiments, an MEA includes discontinuities at an interface of anionic and cationic conductive ionomer layers such as at such interface in a bipolar MEA. In some embodiments, a cathode structure is constructed in a way that includes pores or voids that allow carbon dioxide generated at or proximate to the cathode to evacuate into the cathode.

In some embodiments, such discontinuities or void regions are prepared by fabricating in MEA in a way that separately fabricates anode and cathode structures, and then sandwiches to the two separately fabricated structures together in a way that produces the discontinuities or voids.

In some embodiments, and MEA structure is fabricated by depositing copper or other catalytic material onto a porous or fibrous matrix such as a fluorocarbon polymer and then coating the resulting structure with an anionic conductive ionomer. In some embodiments, the coated structure is then attached to the remaining MEA structure, which may include an anode and a polymer electrolyte membrane such as a cationic conductive membrane.

In some embodiments, a cathode has a porous structure and the/or an associated cathode buffer layer that has a porous structure. The pores may be present in an open cell format that allows generated carbon dioxide or other gas to find its way to the cathode.

In some MEAs, an interface between an anion conducting layer and a cation conducting layer (e.g., the interface of a cathode buffer layer and a PEM) includes a feature that resists delamination caused by carbon dioxide, water, or other material that may form at the interface. In some embodiments, the feature provides void space for the generated material to occupy until as it escapes from an MEA. In some examples, natural porosity of a layer such as an anion conducting layer provides the necessary void space. An interconnected network of pores may provide an escape route for carbon dioxide or other gas generated at the interface. In some embodiments, an MEA contains interlocking structures (physical or chemical) at the interface. In some embodiments, an MEA contains discontinuities at the interface. In some embodiments, an MEA contains of a fibrous structure in one layer adjacent the interface. A further discussion of interfacial structures between anion and cation conducting layers of MEAs is contained in Published PCT Application No. 2021/108446, published Jun. 3, 2021, and titled "MEMBRANE ELECTRODE ASSEMBLY FOR COX REDUCTION," which is incorporated herein by reference in its entirety.

Cathode Catalyst Layer

A primary function of the cathode catalyst layer is to provide a catalyst for $CO_x$ reduction. An example reaction is Reaction 4:

$$CO_2 + 2H^+ + 2e^- \rightarrow CO + H_2O \quad \text{(Reaction 4)}$$

The cathode catalyst layer may also have other functions that facilitate $CO_x$ conversion. These include water management, gas transport, reactant delivery to the metal catalyst, product removal, stabilizing the particulate structure of the metal catalyst, electronic and ionic conduction to the metal catalyst, and mechanical stability within the MEA.

Certain functions and challenges are particular to carbon oxide electrolyzers and are not found in MEA assemblies for other applications such as fuel cells or water electrolyzers. These challenges include that the cathode catalyst layer of the MEA transports gas (e.g., $CO_2$ or CO) in and gas (e.g., ethylene, methane, CO) or liquid (e.g., ethanol) out. The cathode catalyst layer may be designed or configured to prevent accumulation of water that can block gas transport. Further, catalysts for $CO_x$ reduction are sometimes less stable than catalysts like platinum that can be used in hydrogen fuel cells. These functions, their particular challenges, and how they can be addressed are described below.

Water management challenges are in many respects unique to $CO_x$ electrolyzers. For example, compared to a PEM fuel cell's oxygen electrode, a $CO_x$ electrolyzer uses a much lower gas flow rate. A $CO_x$ electrolyzer also may use a lower flow rate to achieve a high utilization of the input $CO_x$. Vapor phase water removal is determined by the volumetric gas flow, thus much less vapor phase water removal is carried out in a $CO_x$ electrolyzer. A $CO_x$ electrolyzer may also operate at higher pressure (e.g., 100 psi-450 psi) than a fuel cell; at higher pressure the same molar flow results in lower volumetric flow and lower vapor phase water removal. For some MEAs, the ability to remove vapor phase water is further limited by temperature limits not present in fuel cells. For example, $CO_2$ to CO reduction may be performed at about 50° C. and ethylene and methane production may be performed at 20° C.-25° C. This is compared to typical operating temperatures of 80° C. to 120° C. for fuel cells. As a result, there is even more liquid phase water to remove.

Properties that affect ability of the cathode catalyst layer to remove water include porosity; pore size; distribution of pore sizes; hydrophobicity; the relative amounts of ion conducting polymer, metal catalyst particles, and electronically-conductive support; the thickness of the layer; the distribution of the catalyst throughout the layer; and the distribution of the ion conducting polymer through the layer and around the catalyst.

A porous layer allows an egress path for water. In some embodiments, the cathode catalyst layer has a pore size distribution that includes some pores having sizes of about 1 nm to 100 nm and other pores having sizes of at least about 1 micron. This size distribution can aid in water removal. The porous structures could be formed by one or more of: pores within the carbon supporting structures (e.g., support particles); stacking pores between stacked carbon nanoparticles; secondary stacking pores between agglomerated carbon spheres (micrometer scale); or inert filler (e.g., PTFE) introduced pores with the interface between the PTFE and carbon also creating irregular pores ranging from hundreds of nm to micrometers.

The thickness of cathode catalyst layer may contribute to water management. Using a thicker layer allows the catalyst and thus the reaction to be distributed in a larger volume. This spreads out the water distribution and makes it easier to manage. In certain embodiments, the cathode layer thickness is about 80 nm-300 μm.

Ion-conducting polymers having non-polar, hydrophobic backbones may be used in the cathode catalyst layer. In some embodiments, the cathode catalyst layer may include a hydrophobic polymer such as PTFE in addition to the ion-conducting polymer. In some embodiments, the ion-conducting polymer may be a component of a co-polymer that also includes a hydrophobic polymer. In some embodiments, the ion-conducting polymer has hydrophobic and hydrophilic regions. The hydrophilic regions can support water movement and the hydrophobic regions can support gas movement.

The cathode catalyst layer may be structured for gas transport. During operation, $CO_x$ is transported to the catalyst and gas phase reaction products (e.g., CO, ethylene, methane, etc.) is transported out of the catalyst layer.

Certain challenges associated with gas transport are unique to $CO_x$ electrolyzers. Gas is transported both in and out of the cathode catalyst layer —$CO_x$ in and products such as CO, ethylene, and methane out. In a PEM fuel cell, gas ($O_2$ or $H_2$) is transported in but nothing or product water comes out. And in a PEM water electrolyzer, water is the reactant with $O_2$ and $H_2$ gas products.

Operating conditions including pressures, temperature, and flow rate through the reactor affect the gas transport. Properties of the cathode catalyst layer that affect gas transport include porosity; pore size and distribution; layer thickness; and ionomer distribution. Example values of these parameters are provided elsewhere herein.

In some embodiments, the ionomer-catalyst contact is minimized. For example, the ionomer may form a continuous network along the surface of the carbon with minimal contact with the catalyst. The ionomer, support, and catalyst may be designed such that the ionomer has a higher affinity for the support surface than the catalyst surface. This can facilitate gas transport to and from the catalyst without being blocked by the ionomer, while allowing the ionomer to conduct ions to and from the catalyst.

The ionomer of a cathode layer may have multiple functions including holding particles of the catalyst layer together and allowing movement of ions through the cathode catalyst layer. In some cases, the interaction of the ionomer and the catalyst surface may create an environment favorable for $CO_x$ reduction, increasing selectivity to a desired product and/or decreasing the voltage required for the reaction. Importantly, the ionomer is an ion-conducting polymer that allows the movement of ions through the cathode catalyst layer. Hydroxide, bicarbonate, and carbonate ions, for example, are moved away from the catalyst surface where the $CO_x$ reduction occurs.

In certain embodiments, an ion-conducting polymer of a cathode comprises at least one ion-conducting polymer that is an anion-conductor. This can be advantageous because it raises the pH compared to a proton conductor.

Various anion-conducting polymers are described above. Many of these have aryl groups in their backbones. Such ionomers may be used in cathode catalyst layers as described herein. In some embodiments, an ion-conducting polymer can comprise one or more covalently bound, positively charged functional groups configured to transport mobile negatively charged ions. Examples of such ion-conducting polymers include aminated tetramethyl polyphenylene; poly(ethylene-co-tetrafluoroethylene)-based quaternary ammonium polymer; quaternized polysulfone), blends thereof, and/or any other suitable ion-conducting polymers. The first ion-conducting polymer can be configured to solubilize salts of bicarbonate or hydroxide.

In some embodiments, an ion-conducting polymer in a cathode comprises at least one ion-conducting polymer that is a cation and an anion-conductor. Examples of such ion-conducting polymer include polyethers that can transport cations and anions and polyesters that can transport cations and anions. Further examples of such ion-conducting polymer include polyethylene oxide, polyethylene glycol, polyvinylidene fluoride, and polyurethane.

During use in an electrolyzer, a cation and anion conductor may raise the local pH (compared to a pure cation conductor.) Further, in some embodiments, it may be advantageous to use a cation and anion conductor to promote acid base recombination in a larger volume instead of at a 2D interface of anion-conducting polymer and cation conducting polymer. This can spread out water and $CO_2$ formation, heat generation, and potentially lower the resistance of the membrane by decreasing the barrier to the acid-base reaction. All of these may be advantageous in helping avoid the buildup of products, heat, and lowering resistive losses in the MEA leading to a lower cell voltage.

In certain embodiments, an anion-conducting polymer has a polymer backbone with covalently bound positively charged functional groups appended. These may include positively charged nitrogen groups in some embodiments. In some embodiments, the polymer backbone is non-polar, as described above. The polymer may have any appropriate molecular weight, e.g., 25,000 g/mol-150,000 g/mol, though it will be understood that polymers outside this range may be used.

Particular challenges for ion-conducting polymers in $CO_x$ electrolyzers include $CO_2$ dissolving in and/or solubilizing the polymers, making them less mechanically stable, prone to swelling, and allowing the polymer to move more freely. This makes the entire catalyst layer and polymer-electrolyte membrane less mechanically stable. In some embodiments, polymers that are not as susceptible to $CO_2$ plasticization are used. Also, unlike for water electrolyzers and fuel cells, conducting carbonate and bicarbonate ions is a key parameter for $CO_2$ reduction.

The introduction of polar functional groups, such as hydroxyl and carboxyl groups which can form hydrogen bonds, leads to pseudo-crosslinked network formation. Cross-linkers like ethylene glycol and aluminum acetylacetonate can be added to reinforce the anion exchange polymer layer and suppress polymer $CO_2$ plasticization. Additives like polydimethylsiloxane copolymer can also help mitigate $CO_2$ plasticization.

According to various embodiments, the ion-conducting polymer may have a bicarbonate ionic conductivity of at least 6 mS/cm, or in some embodiments at least 12 mS/cm, is chemically and mechanically stable at temperatures 80° C. and lower, and soluble in organic solvents used during fabrication such as methanol, ethanol, and isopropanol. The ion-conducting polymer is stable (chemically and has stable solubility) in the presence of the $CO_x$ reduction products. The ion-conducting polymer may also be characterized by its ion exchange capacity, the total of active sites or functional groups responsible for ion exchange, which may range from 2.1 mmol/g-2.6 mmol/g in some embodiments. In some embodiments, ion-conducting polymers having lower IECs such as greater than 1 or 1.5 mmol/g may be used.

Examples of anion-conducting polymers are given above in above table as Class A ion-conducting polymers.

The as-received polymer may be prepared by exchanging the anion (e.g., I⁻, Br⁻, etc.) with bicarbonate.

Also, as indicated above, in certain embodiments the ionomer may be a cation-and-anion-conducting polymer. Examples are given in the above table as Class B ion-conducting polymers.

Further examples of polymer backbones and pendant groups suitable for use in the ion-conducting polymer of the anode layer are described above.

There are tradeoffs in choosing the amount of cation-conducting polymer in the cathode. A cathode may include enough cathode ion-conducting polymer to provide sufficient ionic conductivity, but be sufficiently porous so that reactants and products can move through it easily and to maximize the amount of catalyst surface area that is available for reaction. In various arrangements, the cathode ion-conducting polymer makes up about 10 to 90 wt %, about 20 to 80 wt %, or about 30 to 70 wt % of the material in the cathode layer.

Metal Catalyst (Cathode Catalyst Layer)

In certain embodiments, metal catalysts have one or more of the properties presented above. In general, a metal catalyst catalyzes one or more $CO_x$ reduction reactions. The metal catalyst may be in the form of nanoparticles, but larger particles, films, and nanostructured surfaces may be used in some embodiments. The specific morphology of the nanoparticles may expose and stabilize active sites that have greater activity.

Examples of materials that can be used for the reduction catalyst particles include, but are not limited to, transition metals such as V, Cr, Mn, Fe, Co, Ni, Cu, Zr, Nb, Mo, Au, Ru, Rh, Pd, Ag, Cd, Hf, Ta, W, Re, Ir, Pt, and Hg, and combinations thereof, and/or any other suitable materials. Other catalyst materials can include alkali metals, alkaline earth metals, lanthanides, actinides, and post transition metals, such as Sn, Si, Ga, Pb, Al, Tl, Sb, Te, Bi, Sm, Tb, Ce, Nd and In or combinations thereof, and/or any other suitable catalyst materials. The choice of catalyst depends on the reaction performed at the cathode of the $CO_x$ electrolyzer.

The metal catalyst may be composed of pure metals (e.g., Cu, Au, Ag), but alloys or bimetallic systems may be used for certain reactions. In some embodiments, a metal catalyst comprises a dopant. Examples of dopants include boron, nitrogen, and hydrogen. In some cases, the metal catalyst comprises boron-doped copper. The concentration of dopant may be substantially uniform throughout the metal particle or it may vary as a function of distance from particle surface. For example, the dopant concentration may decrease with distance from the particle surface.

The choice of catalyst may be guided by the desired reaction. For example, for CO production, Au may be used; for methane and ethylene production, Cu may be used. $CO_2$ reduction has a high overpotential compared to other well-known electrochemical reactions such as hydrogen evolution and oxygen evolution on known catalysts. Small amounts of contaminants can poison catalysts for $CO_2$ conversion.

Different metal catalyst materials may be chosen at least in part based on the desired product and MEA operation. For example, the 1D nanowire may have a higher selectivity for ethylene production while triangular Cu nanoplates may have higher selectivity for methane. Nanocubes may show good selectivity for ethylene in an AEM MEA.

Additional details of certain suitable cathode metal catalysts are presented in U.S. patent application Ser. No. 18/053,945, filed Nov. 9, 2022, which is incorporated herein by reference in its entirety.

Support (Cathode Catalyst Layer)

As explained above, support structures may be particles. But more generally, they may have many different shapes such as spheres, polygons (e.g., triangles), nanotubes, and sheets (e.g., graphene)). Structures having high surface area to volume are useful to provide sites for catalyst particles to attach. Support structures may also be characterized by their porosity, surface area per volume, electrical conductivity, functional groups (N-doped, O-doped, etc.), and the like. Various characteristics of particulate support structures are presented above.

If present, a support of the cathode catalyst particles may have any of various functions. It may stabilize metal nanoparticles to prevent them from agglomerating and distribute the catalytic sites throughout the catalyst layer volume to spread out loss of reactants and formation of products. A support may also provide an electrically conductive pathway to metal nanoparticles. Carbon particles, for example, pack together such that contacting carbon particles provide the electrically conductive pathway. Void space between the particles forms a porous network that gas and liquids can travel through.

The support may be hydrophobic and have affinity to the metal nanoparticle.

In many cases, the conductive support particles are compatible with the chemicals that are present in the cathode during operation, are reductively stable, and have a high hydrogen production overpotential so that they do not participate in any electrochemical reactions. In certain embodiments, conductive support particles are larger than the reduction catalyst particles, and each conductive support particle can support many reduction catalyst particles.

Additional details of certain suitable support materials for cathode metal catalysts are presented in U.S. patent application Ser. No. 18/053,945, filed Nov. 9, 2022, which is incorporated herein by reference in its entirety.

Properties of the Cathode Catalyst Layer

In certain embodiments, a cathode layer has a porosity of about 15 to 75%. Porosity of the cathode layer may be determined by various techniques. In one method, the loading of each component (e.g., catalyst, support, and polymer) is multiplied by its respective density. These are added together to determine the thickness the components take up in the material. This is then divided by the total known thickness to obtain the percentage of the layer that is occupied by the material. The resulting percentage is then subtracted from 1 to obtain the percentage of the layer assumed to be void space (e.g., filled with air or other gas or a vacuum), which is the porosity. In some embodiments, porosity is determined directly by a method such as mercury porosimetry or image analysis of TEM images.

The cathode layer may also be characterized by its roughness. The surface characteristics of the cathode layer can impact the resistances across the membrane electrode assembly. Excessively rough cathode layers can potentially lead to interfacial gaps between the catalyst and a current collectors or other electronically conductive support layer such as a microporous layer. These gaps hinder electron transfer from the current collector to the catalytic area, thus, increasing contact resistances. Interfacial gaps may also serve as locations for water accumulation that is detrimental to mass transport of reactants and products. On the other hand, extremely smooth surfaces may suffer from poor adhesion between layers. Cathode layer roughness may influence electrical contact resistances and concentration polarization losses. Surface roughness can be measured using different techniques (e.g. mechanical stylus method, optical profilometry, or atomic force microscopy) and is defined as the high-frequency, short wavelength component of a real surface. Arithmetic mean height, Sa, is a parameter that is commonly used to evaluate the surface roughness. Numerically, it is calculated by integrating the absolute height of valleys and peaks on the surface relative to the mean plane over the entire geometric area of the sample. Cathode layer Sa values between 0.50-1.10 μm or 0.70-0.90 μm may be used in some embodiments.

Additional details of certain suitable cathode catalyst layer properties are presented in U.S. patent application Ser. No. 18/053,945, filed Nov. 9, 2022, which is incorporated herein by reference in its entirety.

PEM

MEAs may include a polymer electrolyte membrane (PEM) disposed between and conductively coupled to the anode catalyst layer and the cathode catalyst layer. In certain embodiments, a polymer electrolyte membrane has high ionic conductivity (e.g., greater than about 1 mS/cm) and is mechanically stable. Mechanical stability can be evidenced in a variety of ways such as through high tensile strength, modulus of elasticity, elongation to break, and tear resistance. Many commercially available membranes can be used for the polymer electrolyte membrane. Examples include, but are not limited to, various Nafion® formulations, GORE-SELECT, FumaPEM® (PFSA) (FuMA-Tech GmbH), and Aquivion® (PFSA) (Solvay).

In one arrangement, the PEM comprises at least one ion-conducting polymer that is a cation-conductor. The third ion-conducting polymer can comprise one or more covalently-bound, negatively-charged functional groups configured to transport mobile positively-charged ions. The third ion-conducting polymer can be selected from the group consisting of ethanesulfonyl fluoride, 2-[1-[difluoro-[(trifluorocthenyl)oxy]methyl]-1,2,2,2-tetrafluorocthoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof.

Cathode Buffer Layer

When the polymer electrolyte membrane is a cation conductor (e.g., it conducts protons), it may contain a high concentration of protons during operation of the reduction electrolyzer, while a cathode may operate better when a low concentration of protons is present. A cathode buffer layer may be provided between the polymer electrolyte membrane and the cathode to provide a region of transition from a high concentration of protons to a low concentration of protons. In one arrangement, a cathode buffer layer is an ion-conducting polymer with many of the same properties as the ion-conducting polymer in the cathode. A cathode buffer layer may provide a region for the proton concentration to transition from a polymer electrolyte membrane, which has a high concentration of protons, to the cathode, which has a low proton concentration. Within the cathode buffer layer, protons from the polymer electrolyte membrane may encounter anions from the cathode, and they may neutralize one another. The cathode buffer layer may help ensure that a deleterious number of protons from the polymer electrolyte membrane does not reach the cathode and raise the proton concentration. If the proton concentration of the cathode is too high, $CO_x$ reduction does not occur. A high proton concentration may be a concentration in the range of about 10 to 0.1 molar and low proton concentration may be a concentration of less than about 0.01 molar.

A cathode buffer layer can include a single polymer or multiple polymers. If the cathode buffer layer includes multiple polymers, the multiple polymers can be mixed together or can be arranged in separate, adjacent layers. Examples of materials that can be used for the cathode buffer layer include, but are not limited to, FumaSep FAA-3, Tokuyama anion exchange membrane material, and polyether-based polymers, such as polyethylene oxide (PEO), and blends thereof. Further examples are given above in the discussion of the cathode catalyst layer.

The thickness of the cathode buffer layer is chosen to be sufficient that $CO_x$ reduction activity is high due to the proton concentration being low. This sufficiency can be different for different cathode buffer layer materials. In general, the thickness of the cathode buffer layer is between approximately 200 nm and 100 µm, between 300 nm and 75 µm, between 500 nm and 50 µm, or any suitable range.

In some embodiments, the cathode buffer layer is less than 50 µm, for example between 1-25 µm such between 1-5 µm, 5-15 µm, or 10-25 µm. By using a cathode buffer layer in this range of thicknesses, the proton concentration in the cathode can be reduced while maintaining the overall conductivity of the cell. In some embodiments, an ultra-thin layer (100 nm-1 µm and in some embodiments, sub-micron) may be used. And as discussed above, in some embodiments, the MEA does not have a cathode buffer layer. In some such embodiments, anion-conducting polymer in the cathode catalyst layer is sufficient. The thickness of the cathode buffer layer may be characterized relative to that of the PEM.

Water and $CO_2$ formed at the interface of a cathode buffer layer and a PEM can delaminate the MEA where the polymer layers connect. The delamination problem can be addressed by employing a cathode buffer layer having inert filler particles and associated pores. One possible explanation of its effectiveness is that the pores create paths for the gaseous carbon dioxide to escape back to the cathode where it can be reduced.

Materials that are suitable as inert filler particles include, but are not limited to, $TiO_2$, silica, PTFE, zirconia, and alumina. In various arrangements, the size of the inert filler particles is between 5 nm and 500 µm, between 10 nm and 100 µm, or any suitable size range. The particles may be generally spherical.

If PTFE (or other filler) volume is too high, it will dilute the polymer electrolyte to the point where ionic conductivity is low. Too much polymer electrolyte volume will dilute the PTFE to the point where it does not help with porosity. In many embodiments a mass ratio of polymer electrolyte/PTFE is 0.25 to 2, and more particularly, 0.5 to 1. A volume ratio polymer electrolyte/PTFE (or, more generally, polymer electrolyte/inert filler) may be 0.25 to 3, 0.5 to 2, 0.75 to 1.5, or 1.0 to 1.5.

In other arrangements, porosity is achieved by using particular processing methods when the layers are formed. One example of such a processing method is laser ablation, where nano to micro-sized channels are formed in the layers. Another example is mechanically puncturing a layer to form channels through it.

In one arrangement, the cathode buffer layer has a porosity between 0.01% and 95% (e.g., approximately between, by weight, by volume, by mass, etc.). However, in other arrangements, the cathode buffer layer can have any suitable porosity (e.g., between 0.01-95%, 0.1-95%, 0.01-75%, 1-95%, 1-90%). In some embodiments, the porosity is 50% or less, e.g., 0.1-50%, 5-50%, 20-50%, 5-40%, 10-40%, 20-40%, or 25%-40%. In some embodiments, the porosity is 20% or below, e.g. 0.1-20%, 1-10%, or 5-10%.

Porosity may be measured as described above with respect to the catalyst layer, including using mass loadings and thicknesses of the components, by methods such as mercury porosimetry, x-ray diffraction (SAXS or WAXS), and image processing on TEM images to calculate filled space vs. empty space. Porosity is measured when the MEA is completely dry as the materials swell to varying degrees when exposed to water during operation.

Porosity in layers of the MEA, including the cathode buffer layer, is described further below.

Layer Porosity

It can be useful if some or all of the following layers are porous: the cathode, the cathode buffer layer, the anode and the anode buffer layer. In some arrangements, porosity is achieved by combining inert filler particles with the polymers in these layers. Materials that are suitable as inert filler particles include, but are not limited to, $TiO_2$, silica, PTFE, zirconia, and alumina. In various arrangements, the size of the inert filler particles is between 5 nm and 500 µm, between 10 nm and 100 µm, or any suitable size range. In other arrangements, porosity is achieved by using particular processing methods when the layers are formed. One example of such a processing method is laser ablation, where nano to micro-sized channels are formed in the layers. Laser ablation can additionally or alternatively achieve porosity in a layer by subsurface ablation. Subsurface ablation can form voids within a layer, upon focusing the beam at a point within the layer, and thereby vaporizing the layer material in the vicinity of the point. This process can be repeated to form voids throughout the layer, and thereby achieving porosity in the layer. The volume of a void is preferably determined by the laser power (e.g., higher laser power corresponds to a greater void volume) but can additionally or alternatively be determined by the focal size of the beam, or any other suitable laser parameter. Another example is mechanically puncturing a layer to form channels through the layer. The porosity can have any suitable distribution in the layer (e.g., uniform, an increasing porosity gradient through the layer, a random porosity gradient, a decreasing porosity gradient through the layer, a periodic porosity, etc.).

The porosities (e.g., of the cathode buffer layer, of the anode buffer layer, of the membrane layer, of the cathode layer, of the anode layer, of other suitable layers, etc.) of the examples described above and other examples and variations preferably have a uniform distribution, but can additionally or alternatively have any suitable distribution (e.g., a randomized distribution, an increasing gradient of pore size through or across the layer, a decreasing gradient of pore size through or across the layer, etc.). The porosity can be formed by any suitable mechanism, such as inert filler particles (e.g., diamond particles, boron-doped diamond particles, polyvinylidene difluoride/PVDF particles, polytetrafluoroethylene/PTFE particles, etc.) and any other suitable mechanism for forming substantially non-reactive regions within a polymer layer. The inert filler particles can have any suitable size, such as a minimum of about 10 nanometers and a maximum of about 200 nanometers, and/or any other suitable dimension or distribution of dimensions.

As discussed above, the cathode buffer layer preferably has a porosity between about 1 and 90 percent by volume but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%, etc.). in some embodiments, the porosity is 20% or below, e.g. 0.1-20%, 1-10%, or 5-10%.

In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode.

Other Embodiments and Conclusion

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

What is claimed is:

1. A system comprising:
    an aluminum production subsystem comprising an aluminum-producing electrolysis cell configured to electrolytically produce aluminum metal from an aluminum compound;
    a carbon dioxide reduction subsystem comprising a carbon dioxide electrolyzer, wherein the carbon dioxide reduction subsystem is configured to receive carbon dioxide produced by the aluminum production subsystem and provide the carbon dioxide to the carbon dioxide electrolyzer for reduction to a carbon-containing product, wherein the carbon-containing product comprises carbon monoxide;
    a carbon dioxide separator configured to remove carbon dioxide from the carbon monoxide produced by the carbon dioxide electrolyzer;
    a carbon dioxide recycle loop configured to recycle at least a portion of the removed carbon dioxide to the carbon dioxide electrolyzer; and
    a hydrogen separator configured to remove molecular hydrogen from the carbon monoxide produced by the carbon dioxide electrolyzer, wherein the aluminum production subsystem is configured to receive the carbon monoxide from the carbon dioxide reduction subsystem.

2. The system of claim 1, wherein the aluminum-producing electrolysis cell is configured to electrochemically reduce aluminum oxide in a molten salt electrolyte.

3. The system of claim 1, wherein the aluminum-producing electrolysis cell is configured to electrochemically reduce an aluminum halide in a molten salt electrolyte.

4. The system of claim 1, wherein the aluminum production subsystem is configured to react the carbon monoxide with an aluminum compound and a halogen to produce an aluminum halide.

5. The system of claim 4, wherein the aluminum halide is aluminum chloride.

6. The system of claim 5, wherein the aluminum production subsystem further comprises a chlorination reactor configured to react aluminum oxide with chlorine and the carbon monoxide, produced by the carbon dioxide reduction subsystem, to produce the aluminum chloride.

7. The system of claim 1, further comprising a $CO_2$ compressor configured to compress the carbon dioxide from the aluminum production subsystem before it is provided to the carbon dioxide electrolyzer.

8. The system of claim 1, further comprising a $CO_2$ purifier configured to purify the carbon dioxide from the aluminum production subsystem before it is provided to the carbon dioxide electrolyzer.

9. A method of producing aluminum metal, the method comprising:
    producing aluminum metal from an aluminum compound using an aluminum production subsystem comprising an electrolysis cell, wherein producing the aluminum metal generates carbon dioxide;
    providing the carbon dioxide to a carbon dioxide electrolyzer;
    electrolytically reducing the carbon dioxide to a carbon-containing product using the carbon dioxide electrolyzer, wherein the carbon-containing product comprises carbon monoxide; and
    delivering the carbon monoxide produced by the carbon dioxide electrolyzer to the aluminum production subsystem;
    wherein, prior to the delivering, the method comprises:
        removing carbon dioxide from the carbon monoxide produced by the carbon dioxide electrolyzer, wherein at least a portion of the removed carbon dioxide is recycled to a cathode inlet of the carbon dioxide electrolyzer; and removing hydrogen from the carbon monoxide produced by the carbon dioxide electrolyzer.

10. The method of claim 9, wherein producing aluminum metal comprises electrochemically reducing aluminum oxide in a molten salt electrolyte.

11. The method of claim 9, wherein producing aluminum metal comprises electrochemically reducing an aluminum halide in a molten salt electrolyte.

12. The method of claim 9, further comprising reacting the carbon monoxide delivered to the aluminum production subsystem with an aluminum compound and a halogen to produce an aluminum halide.

13. The method of claim 12, wherein the aluminum halide is aluminum chloride.

14. The method of claim 13, further comprising reacting aluminum oxide with chlorine and the carbon monoxide to produce the aluminum chloride.

15. The system of claim 1, wherein the carbon dioxide electrolyzer is configured to output carbon dioxide in addition to the carbon monoxide, wherein the carbon monoxide and the carbon dioxide is output in a carbon monoxide to carbon dioxide molar ratio of at least about 1:3.

16. The system of claim 1, wherein the carbon dioxide electrolyzer is configured to output molecular hydrogen in addition to the carbon monoxide, wherein the carbon monoxide and molecular hydrogen is output in a carbon monoxide to molecular hydrogen molar ratio of between 2:1 and 100:1.

17. The system of claim 1, wherein the carbon monoxide received by the aluminum production subsystem from the carbon dioxide reduction subsystem is supplied as a carbon monoxide stream comprising molecular hydrogen in an amount of no more than about 1 mol %.

18. The system of claim 1, wherein the carbon dioxide electrolyzer comprises a membrane electrode assembly, the membrane electrode assembly comprising a cathode layer having a reduction catalyst and an ion-conducting polymer in contact with a polymer electrolyte membrane, wherein the cathode layer is configured to receive gaseous carbon dioxide.

19. The system of claim 1, further comprising a gas-liquid separator configured to receive a cathode output comprising the carbon-containing product from the carbon dioxide electrolyzer and separate liquid from gas prior to providing the gas to the carbon dioxide separator.

20. The system of claim 1, further comprising a degassing and water cleanup unit configured to receive an anode purge liquid outlet stream and/or a cathode water outlet stream from the carbon dioxide electrolyzer and provide deionized water to the carbon dioxide electrolyzer.

* * * * *